(12) United States Patent
Shibata et al.

(10) Patent No.: US 6,456,992 B1
(45) Date of Patent: *Sep. 24, 2002

(54) SEMICONDUCTOR ARITHMETIC CIRCUIT

(75) Inventors: Tadashi Shibata, 5-2, Nihondaira, Taihaku-ku, Sendai-shi, Miyagi-ken 982 (JP); Tadahiro Ohmi, 1-17-301, Komegabukuro 2-chome, Aoba-ku, Sendai-shi, Miyagi-ken 980 (JP); Tatsuo Morimoto, Miyagi-ken (JP); Ryu Kaiwara, Miyagi-ken (JP)

(73) Assignees: Tadashi Shibata, Miyagi-ken (JP); Tadahiro Ohmi, Miyagi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,680

(22) PCT Filed: Mar. 25, 1996

(86) PCT No.: PCT/JP96/00771

§ 371 (c)(1),
(2), (4) Date: Nov. 7, 1997

(87) PCT Pub. No.: WO96/30855

PCT Pub. Date: Oct. 3, 1996

(30) Foreign Application Priority Data

Mar. 24, 1995 (JP) ............................................. 7-066419

(51) Int. Cl.[7] .................................................. G06N 3/04

(52) U.S. Cl. ............................. 706/33; 706/26; 706/34; 706/35; 706/42

(58) Field of Search ............................. 706/26, 33, 34, 706/35, 42

(56) References Cited

U.S. PATENT DOCUMENTS 5,016,211 A * 5/1991 Jeong ......................... 708/706
5,055,897 A * 10/1991 Canepa et al. .............. 257/319
5,086,405 A * 2/1992 Chung et al. ............... 708/505

(List continued on next page.)

FOREIGN PATENT DOCUMENTS

JP  6-244375  9/1994 .......... H01L/27/10

OTHER PUBLICATIONS

Ishii, H.; Shibata, T.; Kosaka, H.; Ohmi, T., Hardware–learning Neural Network LSI Using A Highly–functional Transistor Simulating Neuron Actions, Neural Networks, Jan. 1993. IJCNN '93—Nagoya. Proceedings of 1993 International Joint Conference on, vol.: 1.*

(List continued on next page.)

Primary Examiner—Kakali Chaki
Assistant Examiner—Wilbert L. Starks, Jr.
(74) Attorney, Agent, or Firm—Randall J. Knuth

(57) ABSTRACT

A semiconductor arithmetic circuit which compares the magnitudes of a plurality of data with each other in real time by using a simple circuit.

The semiconductor arithmetic circuit containing one or more neuron MOS transistors each having a plurality of input gate electrodes has an inverter circuit group of a plurality of inverter circuit each of which is constituted of neuron MOS transistors and a means for applying a prescribed signal voltage to at least one first input gate of the inverter circuit. The out put signals of all the inverters in the inverter circuit group, the output signal of a logical operation circuit generated by passing the output signals of the inverters through a multistage inverter circuit and inputting them into the logical operation circuit, or the output signal of a multistage inverter circuit generated by passing the output signal of the logical operation circuit through the multistage inverter circuit is fed back to at least one second input gate of the inverter circuit in the inverter circuit group.

8 Claims, 28 Drawing Sheets

U.S. PATENT DOCUMENTS

| | | | |
|---|---|---|---|
| 5,148,514 A | * 9/1992 | Arima et al. | 706/34 |
| 5,165,010 A | * 11/1992 | Masuda et al. | 706/42 |
| 5,258,657 A | * 11/1993 | Shibata et al. | 326/35 |
| 5,293,457 A | * 3/1994 | Arima et al. | 706/34 |
| 5,343,555 A | * 8/1994 | Yayla et al. | 706/35 |
| 5,355,435 A | * 10/1994 | DeYoung et al. | 706/26 |
| 5,402,369 A | * 3/1995 | Main | 708/625 |
| 5,442,209 A | * 8/1995 | Chung | 257/270 |
| 5,770,966 A | * 6/1998 | Mills | 327/355 |
| 5,864,495 A | * 1/1999 | Sakashita et al. | 708/801 |
| 5,917,732 A | * 6/1999 | Kawakami et al. | 708/201 |
| 5,917,742 A | * 6/1999 | Ohmi et al. | 708/801 |
| 5,937,399 A | * 8/1999 | Ohmi et al. | 706/33 |

OTHER PUBLICATIONS

Au, R.; Yamashita, T.; Shibata, T.; Ohmi, T., Neuron–MOS multiple–valued memory technology for intelligent data processing, Solid–State Circuits Conference, Jan. 1994. Digest of Technical Papers. 41st ISSCC., 1994 IEEE International, pp.: 270–271.*

Shibata, T.; Ohmi, T., An intelligent MOS transistor featuring gate–level weighted sum and threshold operations, Electron Devices Meeting, Jan. 1991. Technical Digest., International, pp.: 919–922.*

* cited by examiner

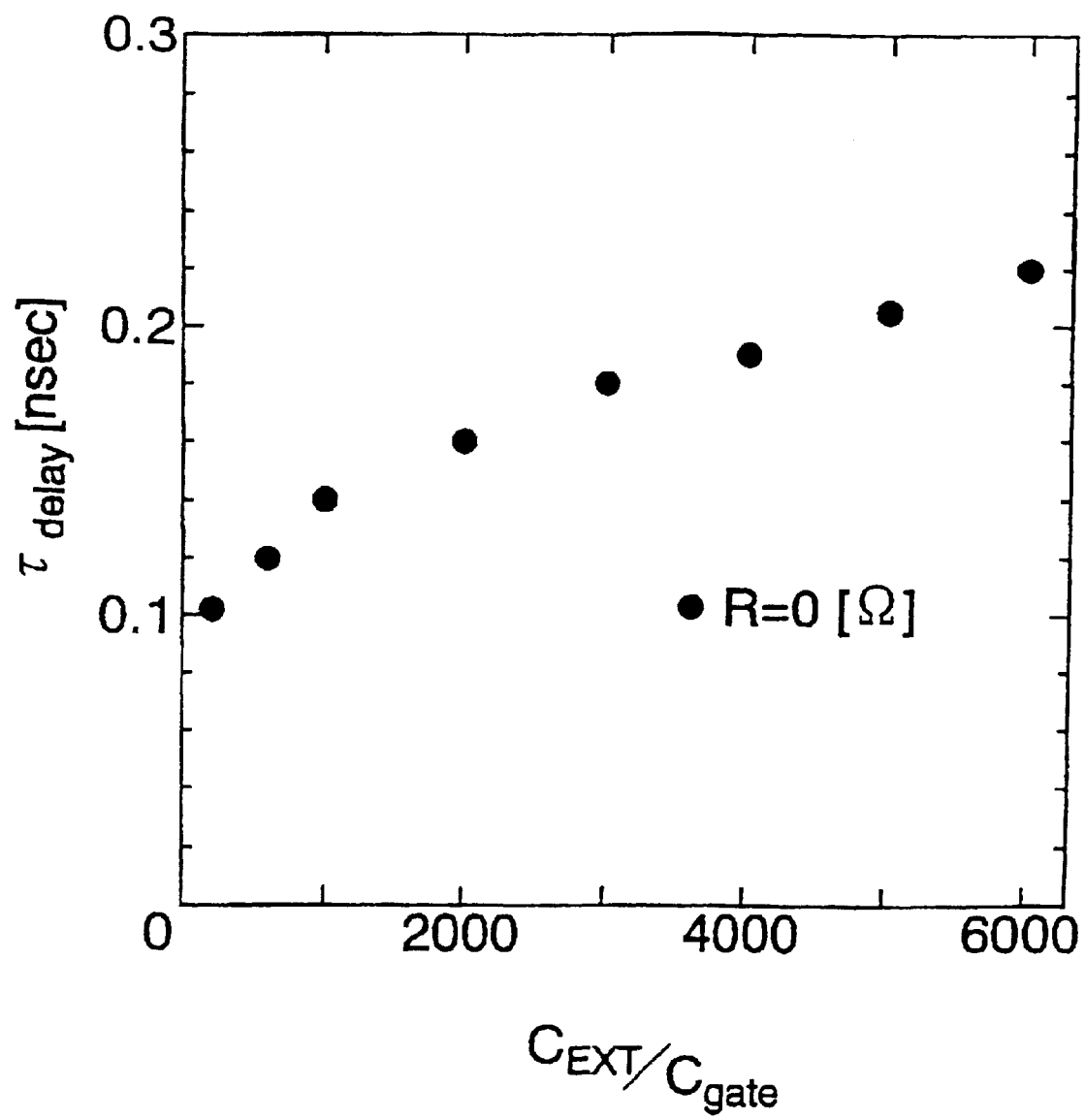
F I G. 35

SEMICONDUCTOR ARITHMETIC CIRCUIT

TECHNOLOGICAL FIELD

The present invention relates to a semiconductor arithmetic circuit, and in particular, provides a highly functional semiconductor integrated circuit which is capable of comparing the magnitudes of a plurality of data at high speeds, and continuously, using hardware.

BACKGROUND ART

In the fields of data processing and automatic control, the comparison of data expressed in numbers, and the discrimination of their magnitudes, plays an extremely important role.

Examples of this include the determination of the larger of 2 numbers, the selection of the datum having the largest value from a plurality of inputted data, the arrangement of a plurality of data according to their numerical size, that is to say, sorting, and the like.

Such operations can be accomplished using common calculators; however, because it is necessary to conduct a large number of calculations, time is required and it is extremely difficult to use such methods in real time control. In particular, in the case of the control of robots and the like, it is necessary to attach calculators to the robots to perform the calculations, so that there has been a demand for the realization of such functions using small LSI chips.

When attempts were made to conduct such operations using microprocessors by means of the programming of these microprocessors, an enormous amount of time was required, and practical application was essentially impossible. Research and development have been conducted into the production of circuits which are directly capable of comparing magnitudes by means of the hardware thereof; however, a large number of elements are required to realize such circuitry, and since calculations are conducted via circuitry having a number of stages, the development of small LSI having high speed arithmetical functions has not yet been realized.

The present invention has as an object thereof to provide a semiconductor device which is capable of conducting, in real time, the high speed comparison of the magnitudes of a plurality of data using simple circuitry.

DISCLOSURE OF THE INVENTION

The present invention is a semiconductor arithmetic circuit constituted using one or more neuron MOS, each having: a semiconductor region of one conductivity type on a substrate, a source and drain regions of an opposite conductivity type provided on said semiconductor region, a floating gate electrode provided via an insulating film at a region separating said source and drain regions, which is in an electrically floating state, and a plurality of input gate electrodes capacitively coupled with said floating gate electrode via an insulating film; wherein an inverter circuit group containing a plurality of inverter circuits constituted as neuron MOS transistors is provided, a means is provided for applying a prescribed signal voltage to at least one first input gate of said inverter circuit, the output signals of all the inverters contained in said inverter circuit group, are inputted directly, or through prescribed number of inverters, to a logical operation circuit, and the output signal of said logical operation circuit is fed back directly, or through prescribed number of inverters, to at least one second input gate of each said inverter circuit contained in said inverter circuit group.

Furthermore, the present invention is a semiconductor arithmetic circuit, comprising a logical circuit group containing a plurality of threshold logical circuits having at least two input terminals, and undergoing a change of state when the sum of or difference between signals inputted into said two input terminals is in excess of a prescribed value, a means for applying a prescribed signal to the first input terminal of said threshold logical circuit, and a logical operation circuit, wherein the output signals of all said threshold logical circuits contained in said logical circuit group are inputted directly or through prescribed number of inverters to said logical operation circuit, and the output signal of said logical operation circuit is fed back directly, or through prescribed number of inverters, to the respective second input terminal of each said threshold logical circuit contained in said logical circuit group.

BRIEF DESCRIPTION OF THE DRAWINGS

FIG. 35 is a graph showing the result when the response time of the output is measured with respect to changing maximum inputs, using R as a parameter.

FIG. 43($b$) is a graph showing the basic operational principle of the entirety of the circuitry of the fourteenth embodiment of the present invention.

| (Description of the References) | |
|---|---|
| 111–116 | inverter circuits, |
| 117–120, 1101a–1103a, 1401–1404 | vMOS cells A, |
| 121 | vMOS cell B, |
| 201 | P type silicon circuit, |
| 202, 203 | N$^+$ diffusion layers |
| 204 | gate insulating film, |
| 205 | channel region, |
| 206 | floating gate electrode, |
| 207 | insulating film, |
| 208a, 208b, 209c, 208d | input gate electrodes, |
| 301, 501, 3001, 3201 | floating gates, |
| 302, 303, 3202, 3203 | vMOS transistors, |
| 304–306, 504–508, 3004–3008, 3204, 3205 | input gates, |
| 307, 509, 510, 2911–2914, 3206, 3207 | inverter circuits, |
| 308, 511, 1101–1109, 1201, 1405–1408 | inverters, |
| 2901–2905 | P channel neuron MOS transistors, |
| 2906–2910 | N channel neuron MOS transistors, |
| 2915, 2916 | integrators (phase compensator circuits), |
| 3601–3604 | OP-Amp cells A, |
| 3605 | OP-Amp cell B, |
| 3606, 3701 | OP-Amps. |

BEST MODE FOR CARRYING OUT THE INVENTION

Hereinbelow, the present invention will be explained in detail based on embodiments; however, it is of course the case that the present invention is in no way restricted to the embodiments described.

(Embodiment 1)

Figure 1:
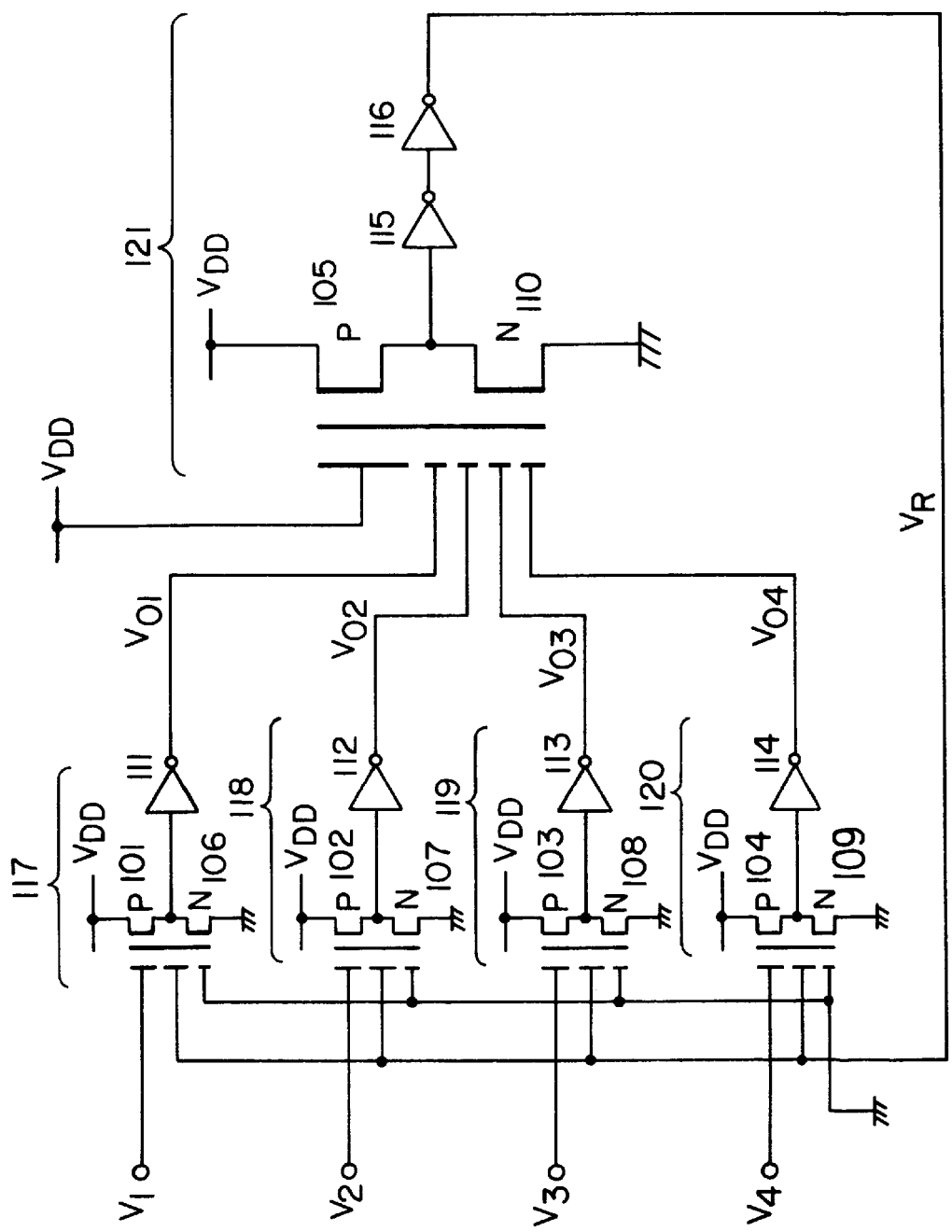
FIG. 1 is a circuit diagram showing a first embodiment of the present invention.

The first embodiment of the present invention will be explained using the circuit diagram in FIG. 1. In the circuitry of FIG. 1, outputs $V_{O1}$, $V_{O2}$, $V_{O3}$, and $V_{O4}$ correspond to the four inputs $V_1$, $V_2$, $V_3$, and $V_4$, respectively, and the value of that output which corresponds to the largest input takes on a value of '1', while the other outputs have a value of '0'. Since only the winner has a value of '1', while all the other outputs have a value of '0', this is a type of circuit which is termed a winner-take-all circuit. The function of this circuit is extremely important not only in neural networks but also in various types of image processing. In this embodiment, the number of inputs is restricted to 4 for the purposes of the explanation; however, it is of course the case that any number of inputs may be employed.

In FIG. 1, references 101–105 indicate P channel neuron MOS transistors, while references 106–110 indicate N channel neuron MOS transistors. Neuron MOS transistors are transistors which have functions similar to those of neurons, which are the cells constituting the brain; these are MOS transistors of a completely novel concept which were invented in order to realize neuron computers (inventors: Tadashi Shibata, Tadahiro Ohmi, Japanese Patent Application, First Publication No. Hei 3-6679). Hereinbelow, these transistors will be referred to in shortened form as vMOS.

These νMOS are transistors having extremely powerful functions; the use of these νMOS as basic elements is a chief feature of the present invention. The structure and functioning of the νMOS will be explained using the attached FIG. 2.

A P channel νMOS (shortened P-νMOS) and a N channel νMOS (shortened to N-νMOS) are respectively connected to a drain, and this forms an inverter circuit having an CMOS structure using neuron MOS. This is termed a complementary νMOS inverter, or, in shortened form, a C-νMOS inverter.

References 111–116 indicate common inverter circuits.

Figure 2A:
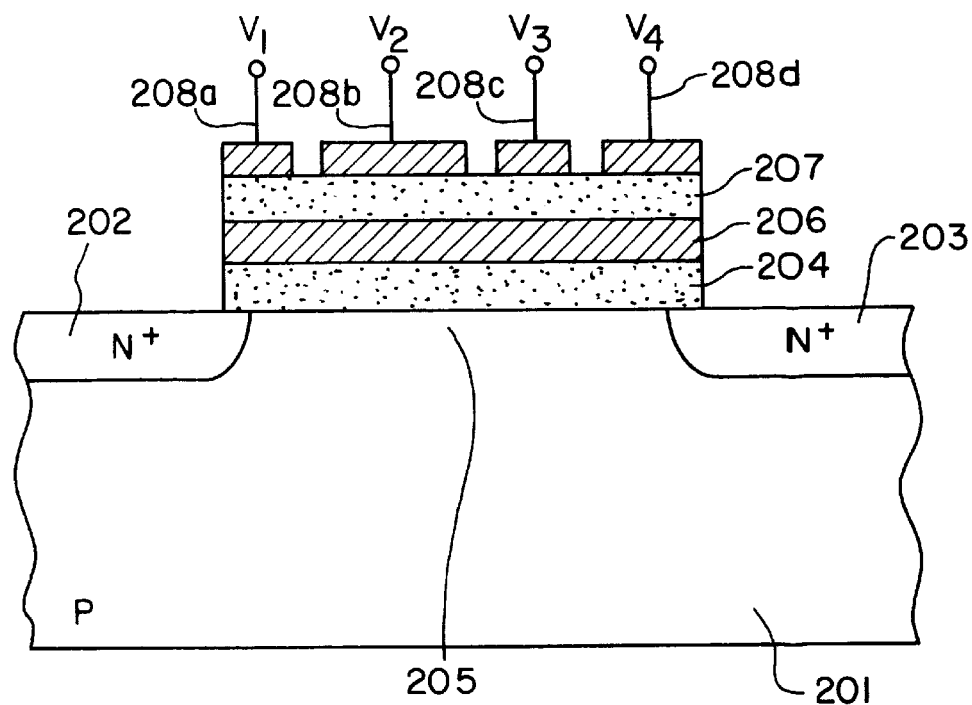
FIG. 2(a) is a cross sectional view showing an example of a 4 input N channel νMOS transistor (N-νMOS) in accordance with the first embodiment of the present invention.
Figure 2B:
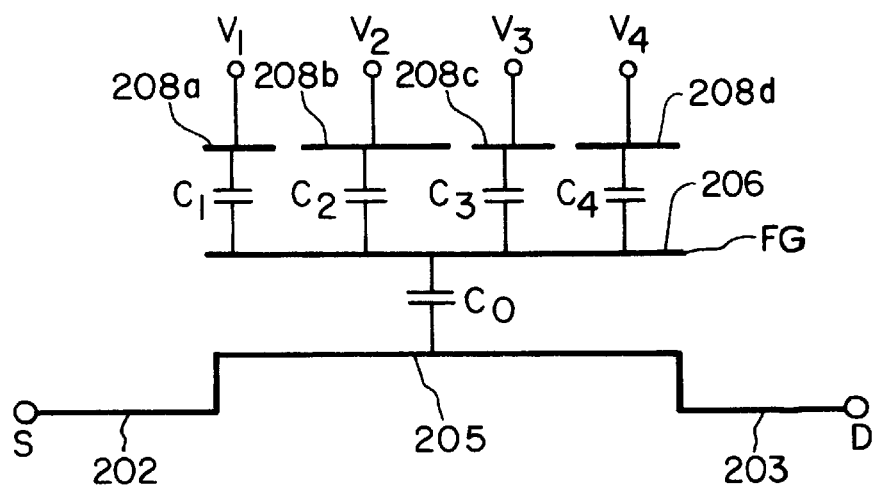
FIG. 2(b) is a diagram showing a further simplification of the νMOS operation for the purpose of explanation.

In order to explain the function of the circuitry of FIG. 1, the structure and basic operational principle of the νMOS will first be explained. FIG. 2(a) shows an example of the cross sectional structure of a 4 input N channel νMOS transistor (N-νMOS); reference 201 indicates, for example, a P type silicon substrate, references 202 and 203 indicate a source and drain formed from $N^+$ dispersion layers, reference 204 indicates a gate insulating film (for example, a $SiO_2$ film) provided on a channel region 205 between the source and the drain, reference 206 indicates a floating gate which is electrically insulated and placed in a potentially floating state, reference 207 indicates an insulating film comprising, for example, $SiO_2$, or the like, and references 208a, 208b, 208c, and 208d indicate input gate electrodes. FIG. 2(b) shows a further simplification of this in order to analyze the operation of the νMOS. If the capacitive coupling coefficient between each input gate electrode and the floating gate are represented as in the figure by $C_1$, $C_2$, $C_3$, and $C_4$, and the capacitive coupling between the floating gate and silicon substrate is represented by $C_0$, then the potential $\phi_F$ of the floating gate is given by the following formula (1).

$$\phi_F=(C_1V_1+C_2V_2+C_3V_3+C_4V_4)/C_{TOT}>V_{TH} \tag{1}$$

Here, $C_{TOT}=C_0+C_1+C_2+C_3+C_4$ $V_1$, $V_2$, $V_3$, and $V_4$ represent voltages which are applied to, respectively, input gates 208a, 208b, 208c, 208d, and the potential of the silicon substrate is 0 V, that is to say, it is grounded.

Now, the potential of source 202 is set to 0 V. That is to say, it is set to a value such that the potential of all the electrodes is measured using the source as a standard. When this is done, the νMOS shown in FIG. 2 is identical to a standard N channel MOS transistor if floating gate 206 is viewed as a standard gate electrode, and when the gate potential $\phi_F$ exceeds a threshold value ($V^*_{TH}$), then an electron channel (N channel) is formed in the region 205 between the source 202 and the drain 203, and the source and the drain become electrically connected. That is to say, νMOS enters an ON state when the following conditions prevail:

$$\phi_F=(C_1V_1+C_2V_2+C_3V_3+C_4V_4)/C_{TOT}>V_{TH} \tag{2}$$

The above explanation centered on a N channel νMOS transistor; however, there are also devices in which the source 202, drain 203, and substrate 201 in FIG. 2(a) are all of the opposite conductivity type. That is to say, in such a νMOS, the substrate is of the N type, while the source and the drain are formed from $P^+$ dispersion layers, and this is termed a P channel MOS transistor (P-νMOS).

Figure 3:
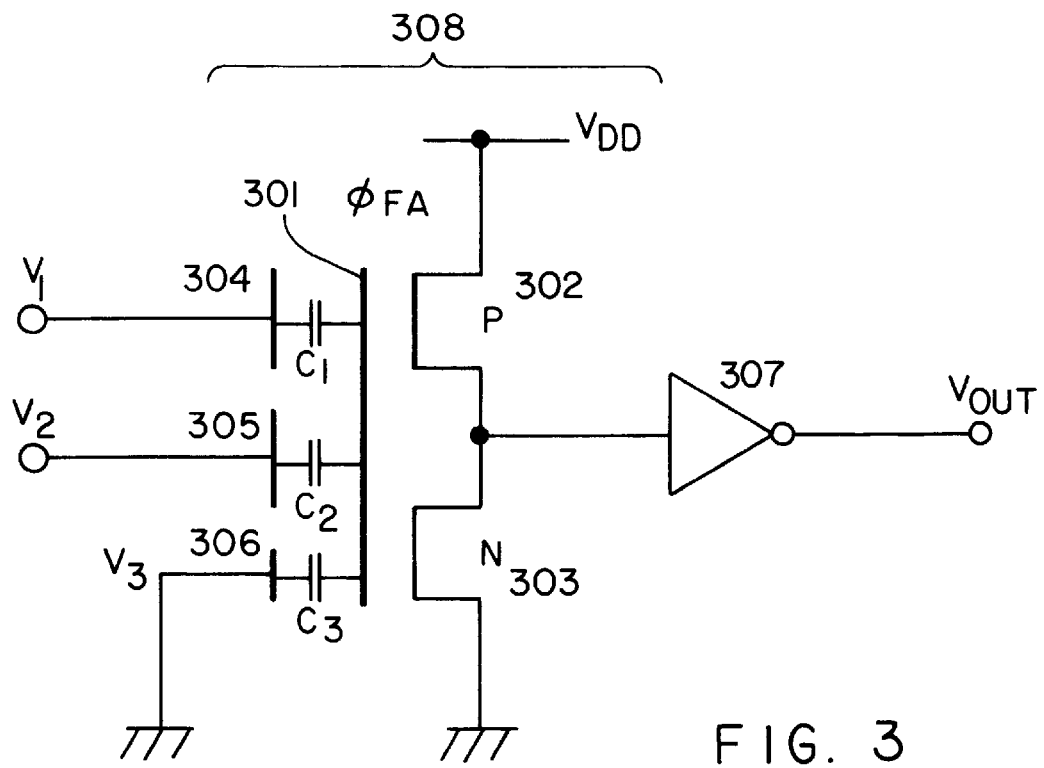
FIG. 3 is a circuit diagram of the first embodiment of the present invention.

In the circuitry of FIG. 3, the previous stage portion 117 is removed in order to explain the operation of the circuitry of FIG. 1. Reference 301 indicates a floating gate, which serves as the common gate for the 2 νMOS (302, 303). References 304, 305, and 306 indicate, respectively, input gates, while $C_1$, $C_2$, and $C_3$ represent the capacitive coupling coefficients between each gate and the floating gate.

3 signal voltages $V_1$, $V_2$, and $V_3$ are inputted into this circuit, and $V_1$ and $V_2$ are signal voltages which change over time in a freely selected manner. $V_3$ is a signal voltage which regulates the functioning of the circuit, and is generally grounded. Reference 307 indicates a standard inverter circuit. The circuitry of 308 is a variable threshold value inverter circuit, the threshold value of which varies in accordance with $V_2$, when seen from the point of view of $V_1$. The circuitry of FIG. 3 is termed the νMOS cell A.

The capacitive coupling ratio with respect to each input may be set, for example, in the following manner. That is to say, the coupling capacitive ratio in νMOS cell A is set as follows:

(Formula 1)

$$\frac{C_1}{C_3} = \frac{C_2}{C_3} = \frac{V_{TH} - V_\delta}{V_{DD} - 2(V_{TH} - V_\delta)} \tag{3}$$

Figure 4:
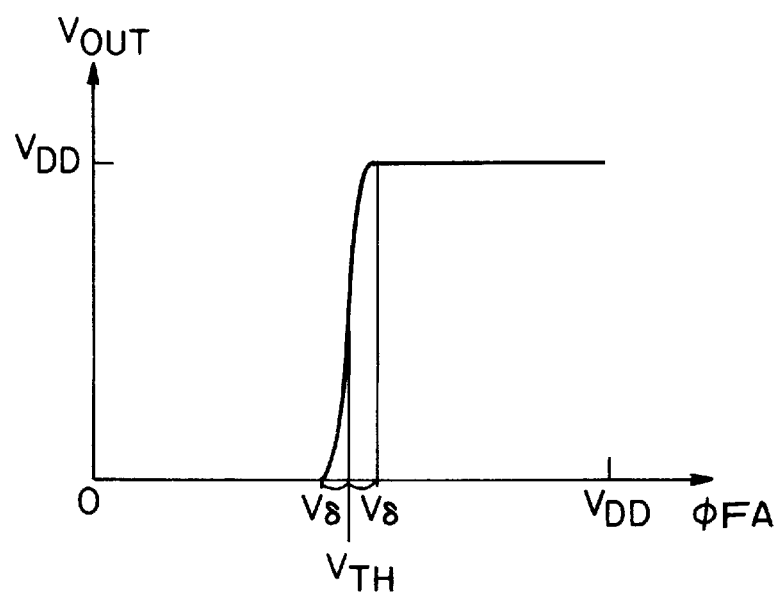
FIG. 4 is a graph showing the relationship between $V_{OUT}$ and $\phi_{FA}$.

However, the relationship between $V_{OUT}$ and $\phi_{FA}$ (the potential of floating gate 301) is as shown in FIG. 4. That is to say, there is a transition region of $2V_{\delta\ in\ \phi FA}$ in the course of which the output changes from 0 to $V_{DD}$.

The operation of the νMOS cell A which is designed in this manner will now be explained.

If the potential of floating gate 301 is represented by $\phi_{FA}$, then the following results:

$$\phi_{FA}=(C_1V_1+C_2V_2+C_3V_3)/C_{TOT} \tag{4}$$

and when $\phi_{FA}$ exceeds the inversion voltage $V_{TH}$ of the inverter as viewed from the floating gate, that is to say, when the following conditions are fulfilled:

$$(C_1V_1+C_2V_2+C_3V_3)/C_{TOT}>V_{TH} \tag{5}$$

the inverter 308 enters an ON state, and the output thereof is inverted. Here, to simplify the explanation, it will be assumed that the following conditions are met:

$$C_0<<C_1+C_2+C_3 \tag{6}$$

and that $C_0$ may be ignored. That is to say, it is assumed that $$C_{TOT}=C_1+C_2+C_3 \tag{7}$$

It is of course the case that the explanation given hereinbelow will be completely identical even if $C_0$ has a value comparable to that of $C_1+C_2+C_3$.

In the circuitry of FIG. 3, the inversion threshold value of the inverter as seen from the floating gate is set to $V_{TH}=V_{DD}/2$, and the design is such that $C_1=C_2$. Furthermore, $V_3$ is set equal to 0 V. It is of course the case that these values may be modified where necessary.

Given the above conditions, the conditions under which the C-νMOS inverter 308 will enter an ON state are as follows:

(Formula 2)

$$(V_1+V_2)\cdot(V_{TH}-V_\delta)/V_{DD}>V_{TH} \tag{8}$$

If the above formula is rewritten so that $V_{DD}/2$ replaces $V_{TH}$, then since $V_\delta<<V_{DD}$, the following results:

(Formula 3)

$$V_1 + V_2 > \frac{V_{DD}}{1 - 2V_\delta/V_{DD}} \approx V_{DD}(1 + 2V_\delta/V_{DD}) = V_{DD} + 2V_\delta \quad (9)$$

That is to say, the inverter of FIG. 3 inverts when the value of $V_1+V_2$ exceeds that of $V_{DD}+2V_\delta$. However, it does not invert when $V_1+V_2=V_{DD}$.

Figure 5:
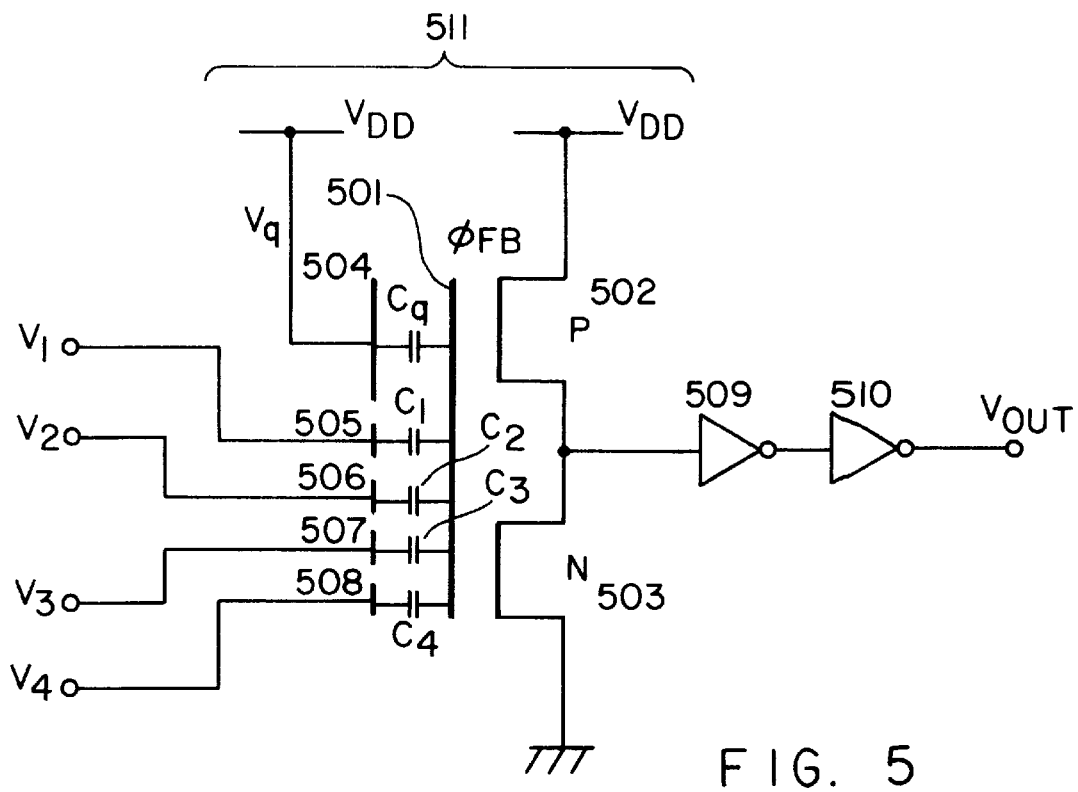
FIG. 5 is a circuit diagram of the first embodiment of the present invention.

In the circuitry of FIG. 5, the latter stage portion 121 is removed in order to explain the operation of the circuitry of FIG. 1.

Reference 501 indicates a floating gate; this gate is common to the 2 νMOS (502 and 503). References 504–508 indicate input gates, and the capacitive coupling coefficients between each gate and the floating gate are represented by $C_q$, $C_1$, $C_2$, $C_3$, and $C_4$.

The five signal voltages $V_q$, $V_1$, $V_2$, $V_3$, and $V_4$ are inputted into this circuit; $V_1$, $V_2$, $V_3$, and $V_4$ are signal voltages which change over time in a freely selected manner, and represent the input voltages from the νMOS cells A described above. $V_q$ is a signal voltage which regulates the operation of the circuit, and it is commonly set to the power source voltage $V_{DD}$. References 509 and 510 are standard inverter circuits. This circuit makes a determination as to whether at least one of the inputs has a value of '1' or if more than one input has such a value. The circuit of FIG. 5 is termed νMOS cell B.

The capacitive coupling ratio with respect to each input may be determined, for example, in the following manner. That is to say, $C_1$, $C_2$, $C_3$, and $C_4$ are set equal to one another, and the following results:

$$C_q/C_1=(1/2)\cdot\{(2nV_{TH}-V_{DD})/(V_{DD}-V_{TH})\} \quad (10)$$

Here, n indicates the number of inputs, and in this case, n equals 4. If $V_{TH}$ is set equal to $V_{DD}/2$, then the following results $$C_q/C_1=n-1 \quad (11)$$

In general, the following results:

$$C_q/(C_1+C_2+\ldots+C_n)=(n-1)/n \quad (12)$$

The operation of the νMOS cell B which is designed in this manner will now be explained.

If the potential of the floating gate 501 is represented by $\phi_{FB}$, then the following results:

$$\phi_{FB}=(C_qV_q+C_1V_1+C_2V_2+C_3V_3+C_4V_4)/C_{TOT} \quad (13)$$

and when $\phi_{FB}$ exceeds the inversion voltage $V_{TH}$ of the inverter as seen from the floating gate, that is to say, when the following conditions are fulfilled:

$$\phi_{FB}=(C_qV_q+C_1V_1+C_2V_2+C_3V_3+C_4V_4)/C_{TOT}>V_{TH} \quad (14),$$

the C-νMOS inverter 511 enters an ON state, and the output thereof is inverted. Here, in order to simplify the explanation, it is assumed that the following conditions are met:

$$C_0<<C_q+C_1+C_2+C_3+C_4 \quad (15),$$

and it is assumed that $C_0$ may be ignored. That is to say, it is assumed that:

$$C_{TOT}=C_q+C_1+C_2+C_3+C_4 \quad (16)$$

It is of course the case that the following explanation will be identical even if $C_0$ has a value approximately similar to $C_q+C_1+C_2+C_3+C_4$.

In the circuit of FIG. 5, $C_1$, $C_2$, $C_3$, and $C_4$ are set equal to one another. Furthermore, $V_q$ is normally equal to $V_{DD}$. It is of course the case that these values may be modified where necessary.

Under the conditions described above, the conditions in which the C-νMOS inverter 511 will enter an ON state are:

$$(3V_{DD}+V_1+V_2+V_3+V_4)/7>V_{DD}/2 \quad (17).$$

As is clear from this formula, when $V_1=V_2=V_3=V_4=0$, the above formula will not hold true, and the inverter will not invert. However, if one or more of $V_1$, $V_2$, $V_3$, and $V_4$ assume a value of $V_{DD}$, then the formula will be true, and C-νMOS inverter 511 will invert.

Figure 6:
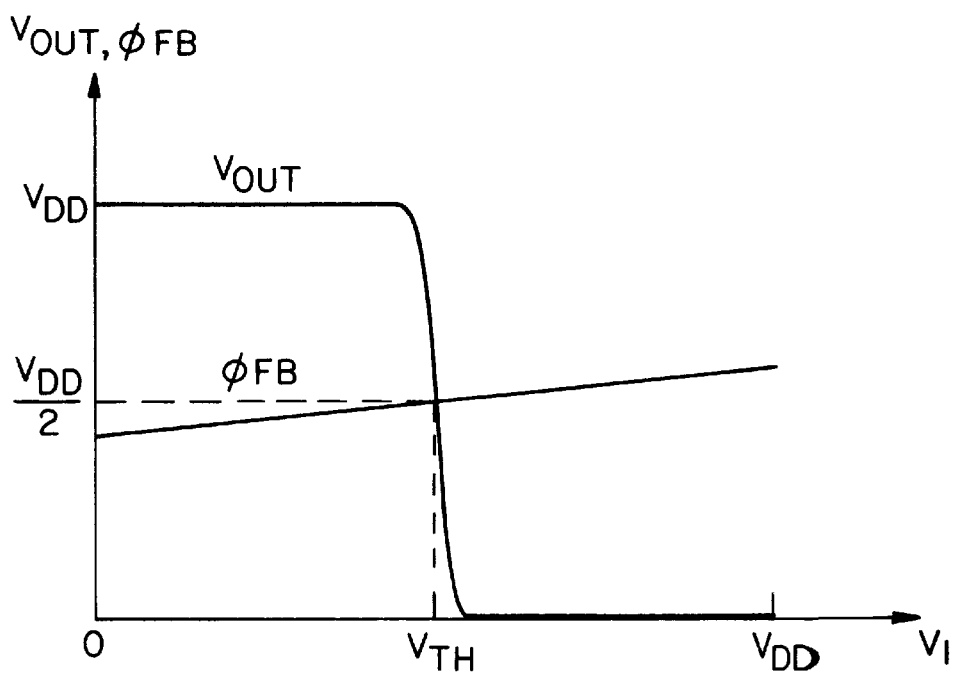
FIG. 6 is a graph showing the relationship between the $V_1$ of νMOS cell B, the potential $\phi_{FB}$ of the floating gate, and the output $V_{OUT}$.

In FIG. 6, the $V_1$ of a νMOS cell B designed with these values is plotted along the horizontal axis, while the potential $\phi_{FB}$ of the floating gate and the output $V_{OUT}$ are plotted along the vertical axis. The case is shown in which $V_2$–$V_3$ have fallen to the ground potential. The floating gate potential intersects threshold voltage $V_{DD}/2$ by means of $V_1$, and the output of νMOS inverter 511 is inverted.

As shown in FIG. 1, when the output of νMOS cell B 121 is fed back to each νMOS cell A (117–120), then a ring oscillator is formed comprising an odd number of stages of inverters.

A discussion of the fundamental operating principle of the circuit as whole follows.

Figure 7:
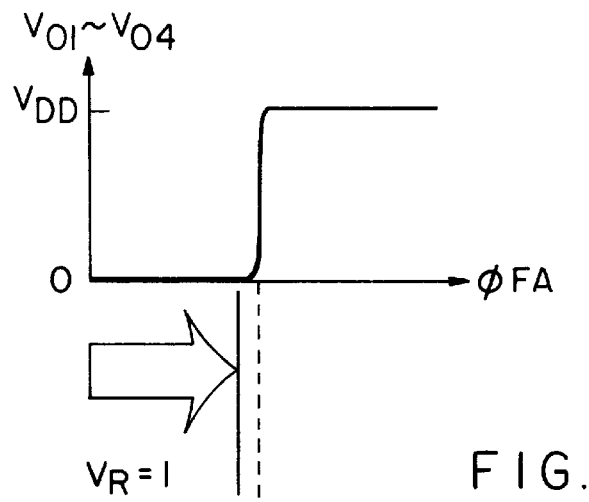
FIG. 7 is a graph showing the basic operational principle of the entirety of the circuitry of the first embodiment of the present invention.

First, when all the inputs have a value of 0, the outputs of all the νMOS cells A have a value of '0', and the output of the νMOS cell B has a value of '1'. This output is fed back to the νMOS cells A; however, since all the inputs have a value of 0, the νMOS cells A are stable, constantly outputting a value of '0', as shown in FIG. 7.

Figure 8:
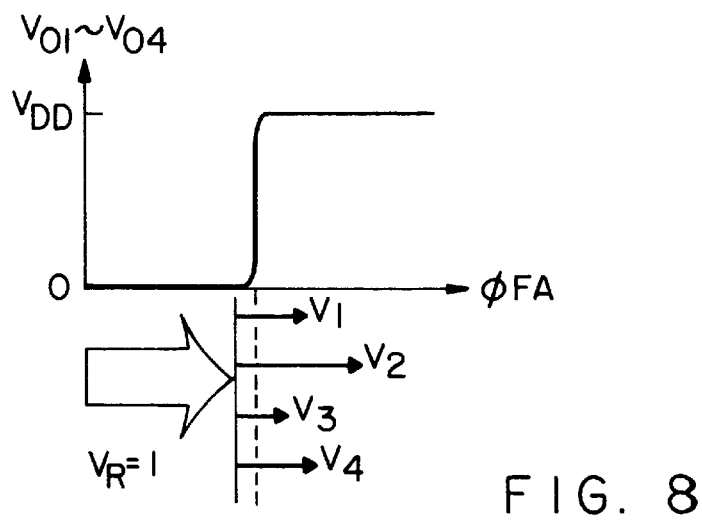
FIG. 8 is a graph showing the basic operational principle of the entirety of the circuitry of the first embodiment of the present invention.

Next, a signal voltage is applied to the input terminals of each νMOS cell A. For example, if it is assumed that 3 V is inputted into cell 117, 4.5 V is inputted into cell 118, 2 V is inputted into cell 119 and 3.5 V is inputted into cell 120, then $\phi_{FA}$ is increased by the amount of the input voltage, as shown in FIG. 8, and all νMOS cells A (117–120) invert, and output a value of '1'. The νMOS cell B 121 reacts to this by beginning to decrease $V_R$ in the direction of 0. When $V_R$ is decreased, the first νMOS cell A which has its output fall to a level of '0' is that which has the smallest input voltage, cell 119. Next, the νMOS cell A having the next smallest input voltage, cell 117, has its output fall to a level of '0', and then the output of νMOS cell A 120 falls to '0'. However, as long at least one of $V_1$–$V_4$ inputs a value of '1' into νMOS cell B 121, the inversion state is maintained, so that until the output of the final νMOS cell A 118 changes from 1 to 0, $V_R$ continues to decline. When the output of the last νMOS cell A 118 finally reaches a value of '0', then the state of νMOS cell B 121 is inverted, and then $V_R$ begins to increase in the direction of '1'. When this occurs, the output of the νMOS cell A having the largest input voltage, cell 118, changes to a level of '1' and the state of νMOS cell B 121 again is inverted, and $V_R$ begins to decrease in the direction of '0'.

Figure 9:
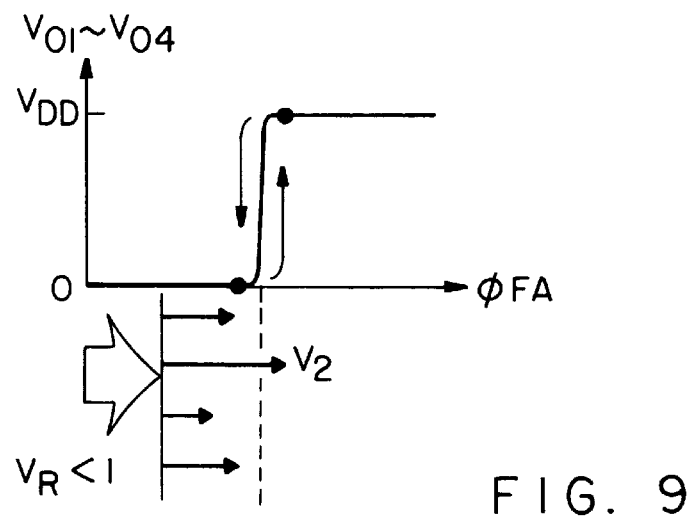
FIG. 9 is a graph showing the basic operational principle of the entirety of the circuitry of the first embodiment of the present invention.

In this way, $V_R$ is set so as to oscillate in the vicinity of the threshold value of the νMOS cell A 118, which has the largest input, so that the oscillation loop of this circuit is formed so as to constantly include the νMOS cell A 118, which has the largest input (FIG. 9). In this way, it is possible to specify the position of the largest input voltage in a time continuous manner.

Figure 10:
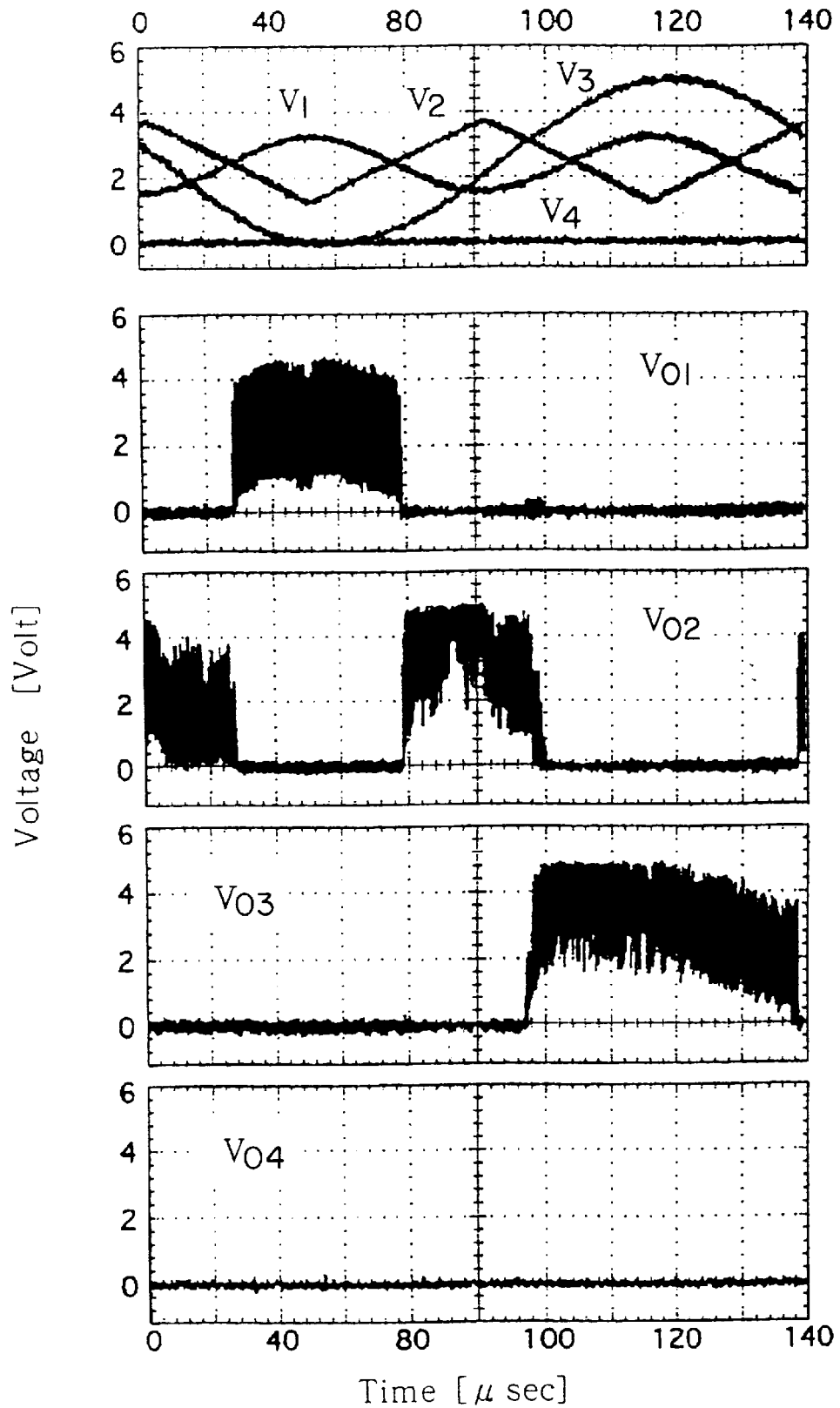
FIG. 10 shows the operational waveform of a time continuous follow-up type winner take all circuit of the first embodiment of the present invention.

FIG. 10 shows the operational waveform of the time continuous follow up type winner-take-all circuit of the present invention. The uppermost waveform is the input waveform. Measurements were conducted in the present circuit without the use of a buffer circuit in the output portion thereof, so that the operating speed is on the order of μsec.

Figure 39:
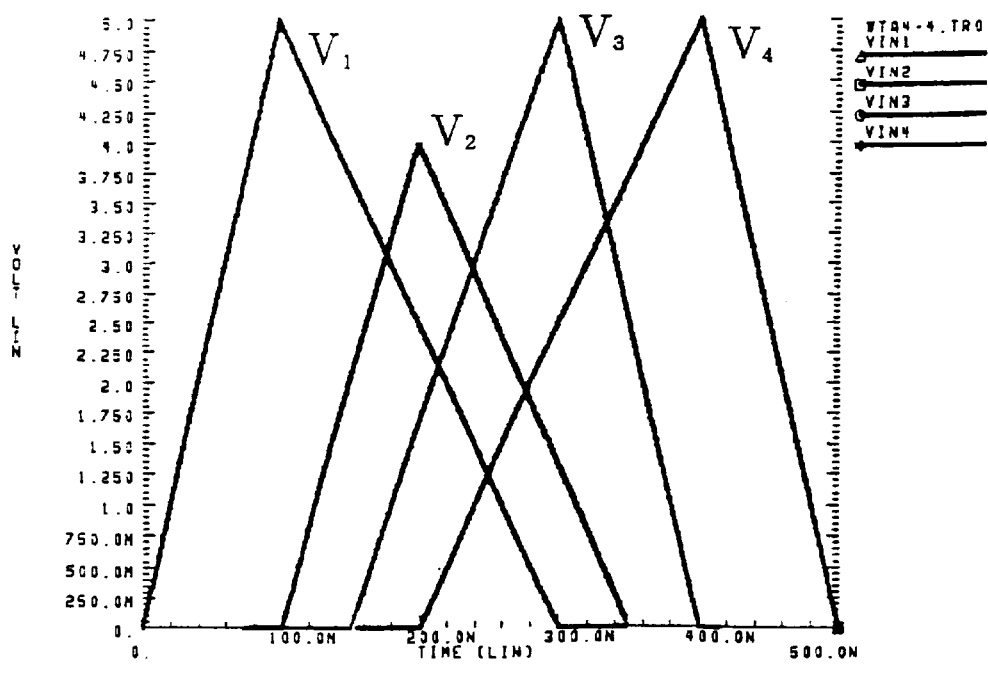
FIG. 39 is a graph showing the results obtained when the operational speed of the circuit of the first embodiment of the present invention was calculated using a simulation.
Figure 39:
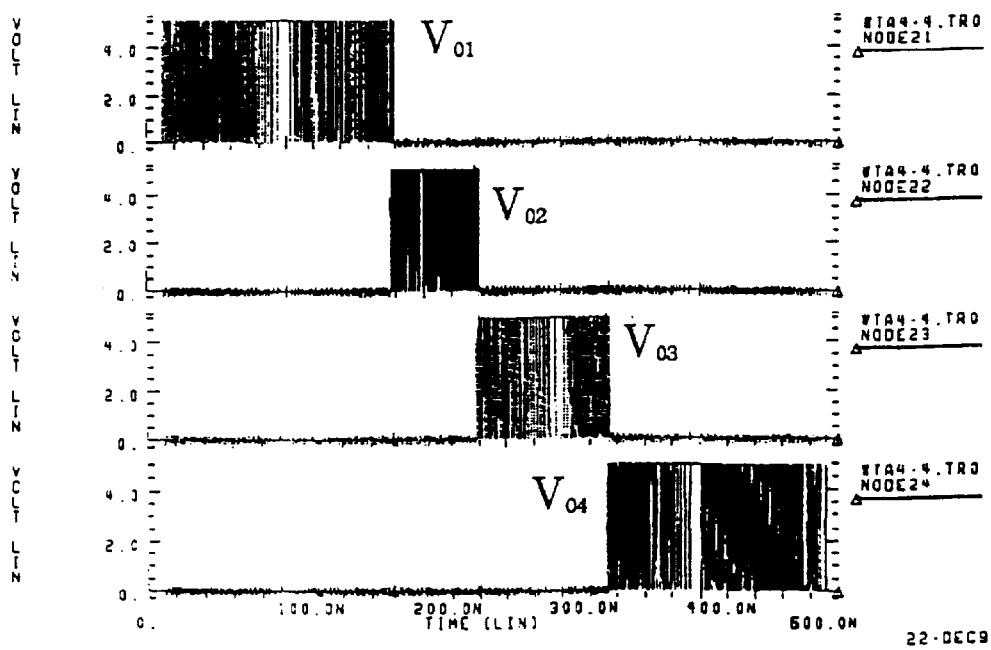

However, in the results of a measurement using a simulation (FIG. 39), it was discovered that it is possible to select the largest input in 1 nsec or less. As described above, the semiconductor arithmetic circuit of the present invention is capable of specifying the largest input at extremely high speed.

In conventional methods employing software, a comparison of all the numbers was conducted, so that as the number of data increased, the operation became extremely slow; however, by means of the present invention, it has become possible for the first time to find the largest value in real time.

(Embodiment 2)

The second embodiment of the present invention will be explained using the circuit diagram of FIG. 11.

Figure 11:
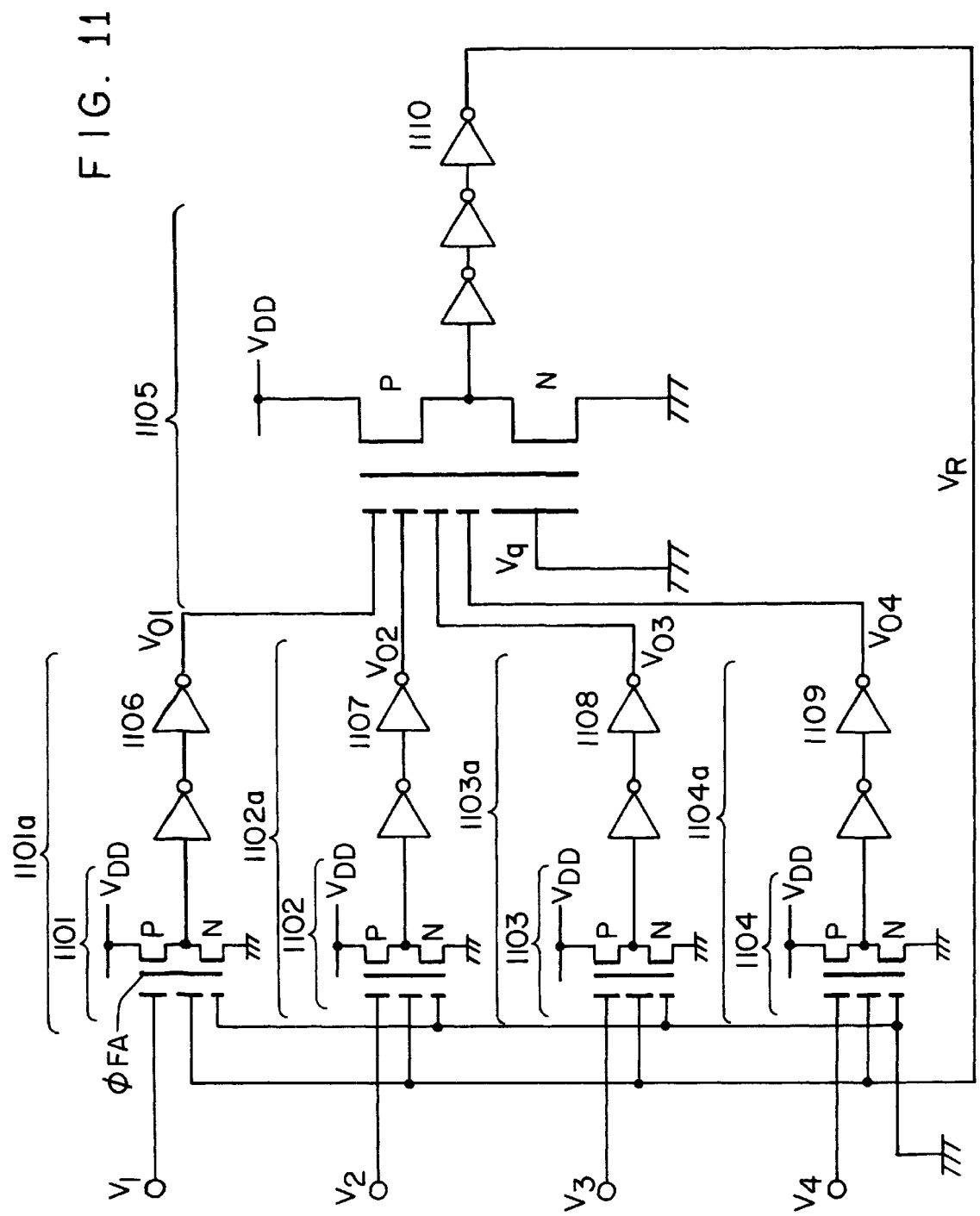
FIG. 11 is a circuit diagram of the second embodiment of the present invention.

In the same manner as the first embodiment, the circuit of FIG. 11 has outputs $V_{O1}$, $V_{O2}$, $V_{O3}$, and $V_{O4}$, which correspond, respectively, to 4 input signals $V_1$, $V_2$, $V_3$, and $V_4$; only that output corresponding to the largest input has a value of '0', while all the other outputs have a value of '1'. In this embodiment, the number of inputs is restricted to 4 in order to simplify the explanation; however, it is of course the case that any number of inputs may be employed.

The points of difference with the circuitry of FIG. 1 are that another inverter is applied at each output of the C-νMOS inverters (1101–1109), another inverter is applied to the output of the C-νMOS inverter 1105, and that $V_q$ is set equal to 0 V.

By means of this, the circuitry of FIG. 11 operates in accordance with logic which is the exact opposite of that of the circuit of embodiment 1. That is to say, if there is no input into νMOS cells A (1101a–1103a), then these always output a value of '1', and when the floating gate potential $\phi_{FA}$ becomes sufficiently large, a value of '0' is outputted. Furthermore, when at least one of the outputs of the νMOS cells C has a value of '0' then νMOS cell B sets $V_R$ to '0'.

Except for the fact that the logic is inverted, the operation of the circuit of FIG. 11 is identical to that of the circuit of embodiment 1, so that an explanation thereof will be omitted here.

In so far as the operation is similar to that of embodiments 1 and 2 described above, any number, including 0, of standard inverters may be attached to each C-νMOS inverter.

(Embodiment 3)

In the above described embodiments, the output waveform which determines the largest input is the oscillation state. However, it is possible to attach an integrator to this output and to thus stabilize the output waveform.

Figure 12:
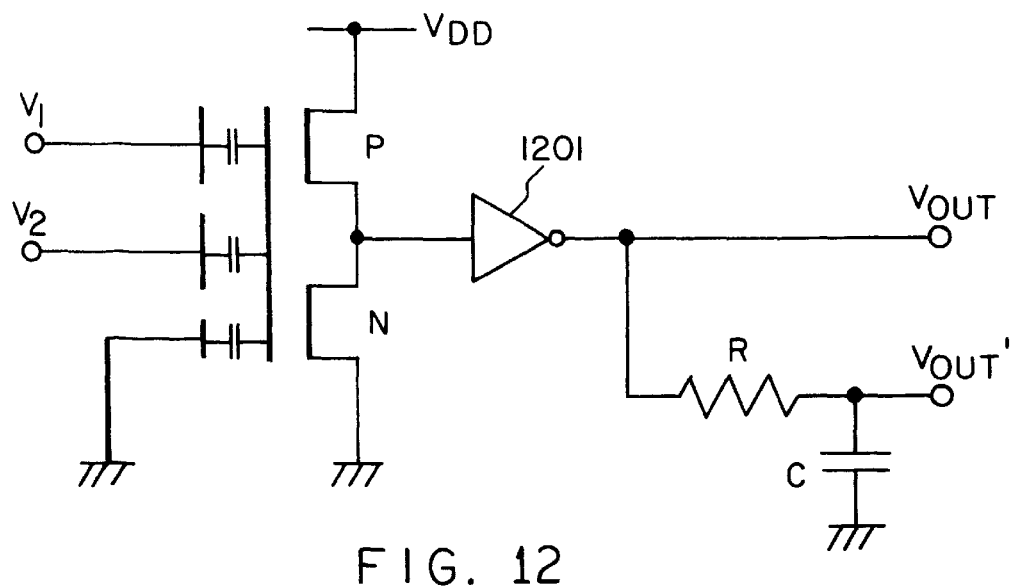
FIG. 12 is a circuit diagram of the third embodiment of the present invention.

The circuit of FIG. 12 depicts a νMOS cell A. The other circuitry is identical to that in embodiment 1, so that it is omitted in this figure.

The inputs of the circuit of FIG. 12 are identical to those in the first embodiment, and this circuit has 2 outputs: $V_{OUT}$ and $V'_{OUT}$. $V_{OUT}$ is connected to the νMOS cell B of the next stage, while the output of the circuit as a whole is measured by $V'_{OUT}$.

By means of inserting an integrator at the output of the νMOS cell A as in the circuitry of FIG. 12, it is possible to obtain a stable output waveform. Here, an integrator comprising a resistor and a capacitor is attached; however, any type may be employed insofar as it is a device which removes the high frequency component of the oscillation waveform.

For example, an integrator employing an operational amplifier (OP-Amp) may be used. Furthermore, where necessary, $V'_{OUT}$ may be inputted into an inverter or the like and waveform shaping may be conducted. Alternatively, if the time constant determined by the product of the channel resistance of the N-MOS and P-MOS comprising inverter 1201 and the input capacity of the inverter into which $V'_{OUT}$ is inputted is sufficiently large, then it is of course the case that it is possible to omit the R and C of FIG. 12.

(Embodiment 4)

The fourth embodiment of the present invention will be explained using the circuit diagram of FIG. 13.

Figure 13:
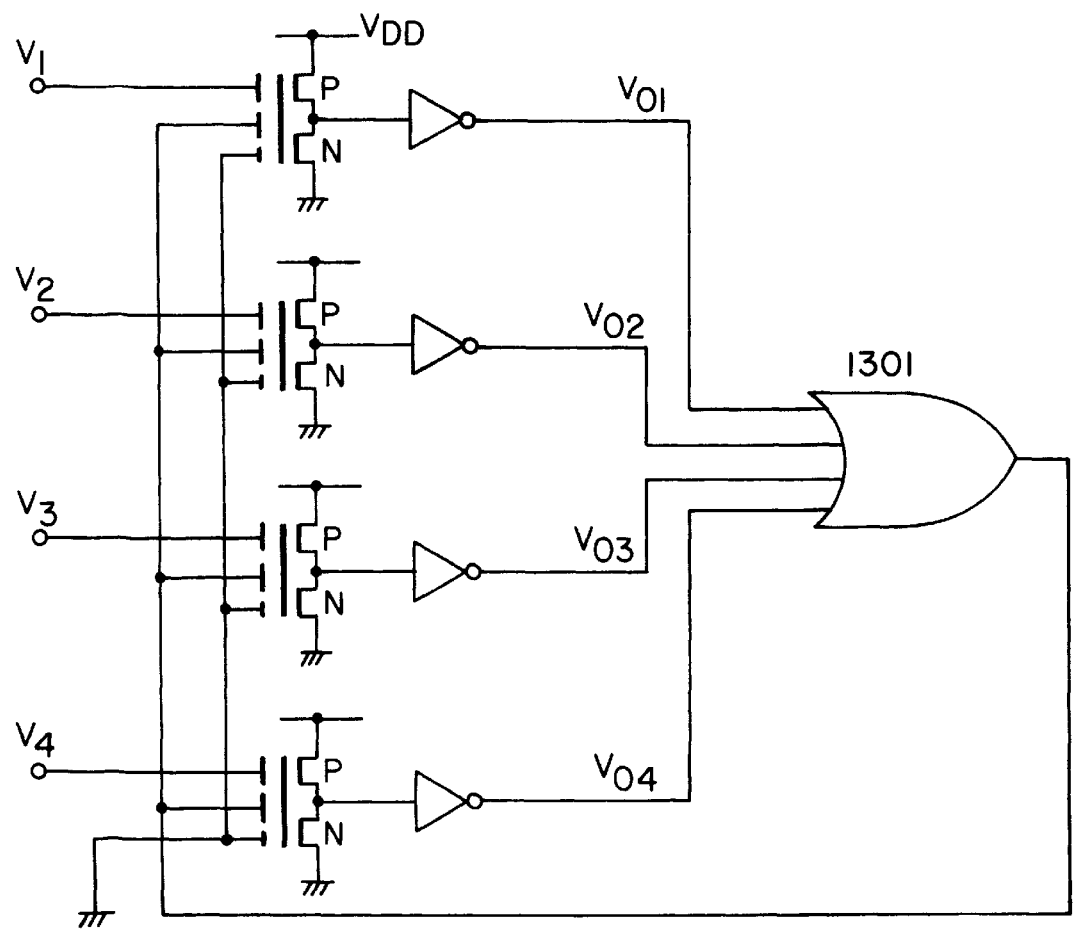
FIG. 13 is a circuit diagram of the fourth embodiment of the present invention.

In the same way as the first embodiment, the circuit of FIG. 13 has outputs $V_{O1}$, $V_{O2}$, $V_{O3}$, and $V_{O4}$ corresponding to, respectively, the 4 input signals $V_1$, $V_2$, $V_3$, and $V_4$, and only that output corresponding to the largest input acquires a value of '1', while all other outputs have a value of '0'. In this embodiment, the number of inputs was limited to 4 in order to simplify the explanations; however, it is of course the case that any number of inputs may be employed.

The difference between this circuit and the circuit of FIG. 1 lies in the fact that the νMOS cell B is replaced with OR circuit 1301. The operation of the circuit of FIG. 13 is identical to that of embodiment 1, so that an explanation thereof will be omitted here. This OR circuit may be an CMOS OR circuit, or alternatively, a so called WIRED OR circuit may be employed.

(Embodiment 5)

A fifth embodiment of the present invention will be explained using the circuit diagram of FIG. 14.

Figure 14:
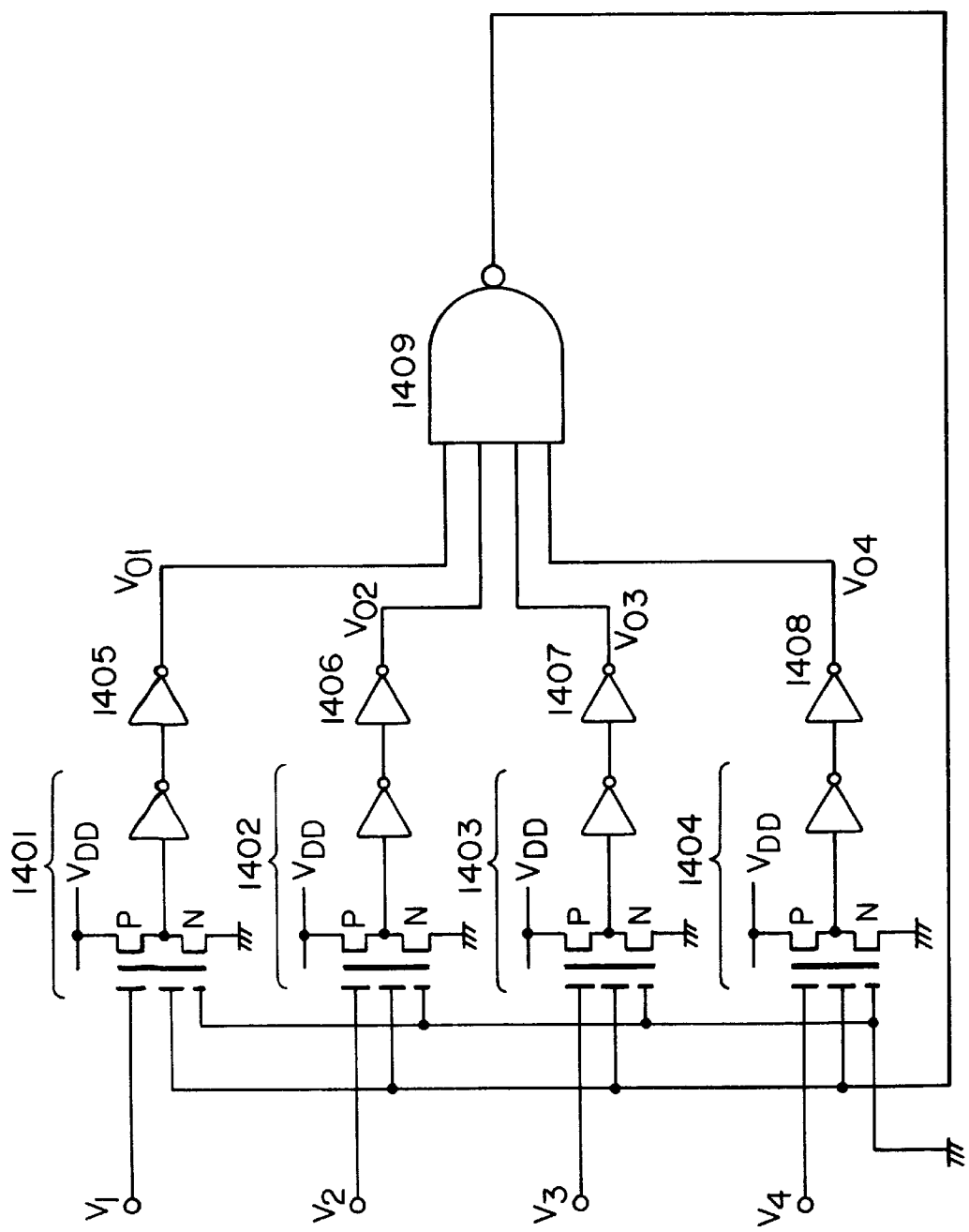
FIG. 14 is a circuit diagram of the fifth embodiment of the present invention.

In the same manner as embodiment 1, the circuit of FIG. 14 has outputs $V_{O1}$, $V_{O2}$, $V_{O3}$, and $V_{O4}$ which correspond, respectively, to the 4 input signals $V_1$, $V_2$, $V_3$, and $V_4$; only that output corresponding to the largest input acquires a value of '0', while all other outputs have a value of '1'. In this embodiment, the number of inputs was restricted to 4 in order to simplify the explanation; however, it is of course the case that any number of inputs may be employed.

The points of difference between this circuit and the circuit of FIG. 1 are that inverters (1405–1408) are applied to each output of the νMOS cells A (1401–1404), and that the νMOS cell B is replaced by a NAND circuit 1409.

By means of this, the circuit of FIG. 14 operates according to logic similar to that of the circuit of embodiment 2. The operation of the circuit of FIG. 14 is identical to that of embodiment 2, so that an explanation thereof will be omitted here.

(Embodiment 6)

A sixth embodiment of the present invention will be explained using the circuit diagram of FIG. 15.

Figure 15:
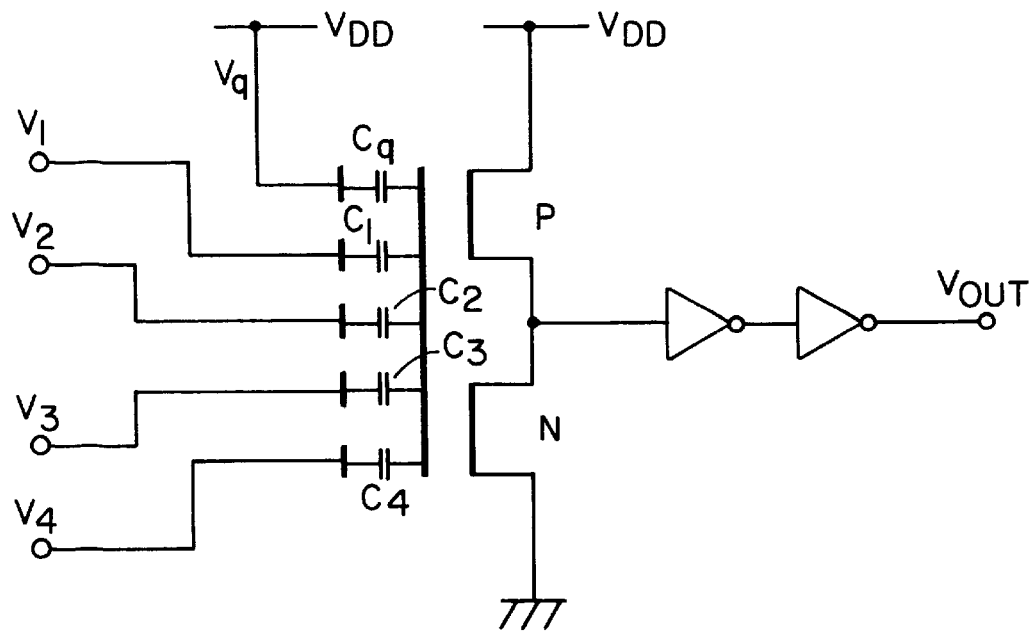
FIG. 15 is a circuit diagram of the sixth embodiment of the present invention.

The circuit of FIG. 15 depicts only the νMOS cell B. The other circuitry is identical to that of the first embodiment, so that it is omitted. The difference between this circuit and that of FIG. 1 is that the coupling capacity ratio of the νMOS cell B is changed.

The operation of the νMOS cell B of the circuit of FIG. 15 will be explained. The circuitry other than the νMOS cell B is identical to that of embodiment 1, so that an explanation thereof will omitted here.

This νMOS cell B is a circuit which makes a determination as to whether at least 2 values of '1' are present among the inputs, or whether more than 2 are present.

Each coupling capacity ratio may be set so that, for example, $$C_1 = C_2 = C_3 = C_4 = C_q \tag{18}$$

The νMOS cell B designed in this manner oscillates in a loop including the νMOS cell A into which the signal having the second largest input voltage is inputted. The νMOS cell A having the largest input outputs a value of '1', while the third and fourth largest output a value '0'.

By means of altering the capacitive coupling coefficient of the νMOS cell B as described above, it is possible to freely alter which cell is adopted; any cell from the uppermost to the least may be used.

In this embodiment, as well as in embodiments 2–5 above, it is of course the case that a circuit is also possible in which an integrator is inserted at the output, or in which the logic is inverted.

Furthermore, the design of the capacity ratio given here is only an example, and it is of course the case that where necessary, this ratio may be set to a freely selected value.

For example, $C_q$ may be divided into three capacitors $C_{q1}$, $C_{q2}$, and $C_{q3}$, and the design may be such that $C_{q1}=C_{q2}=C_{q3}=C_1=C_2=C_3=C_4$. By proceeding in this manner, if $V_{DD}$ is inputted into all of the input terminals of $C_{q1}$, $C_{q2}$, and $C_{q3}$, then the circuit will be one which determines whether or not one or more values of 1 are present in the inputs. Furthermore, if any one of the inputted values (for example, the $C_{q1}$ input) is set to 0 V, then the circuit will determine whether 2 or more values of 1 are present among the inputs. Furthermore, if both $C_{q1}$ and $C_{q2}$ are set to 0 V, then the circuit will determine whether 3 or more values of 1 are present. That is to say, by means of setting the inputs of the $C_{q1}$, $C_{q2}$, and $C_{q3}$ capacitors to a value of $V_{DD}$ or a value of 0, the circuit maybe altered so as to determine whether a freely selected number of inputs is present. In general, in the case of a number of inputs n, it is the case that $C_q$ is divided into a number n−1 of capacitors, and that the design is such that $C_{q1}=C_{q2}= \ldots C_{qn-1}=C_1=C_2=C_3= \ldots =C_n$.

(Embodiment 7)

A seventh embodiment of the present invention will be explained using the circuit diagram of FIG. 16.

Figure 16:
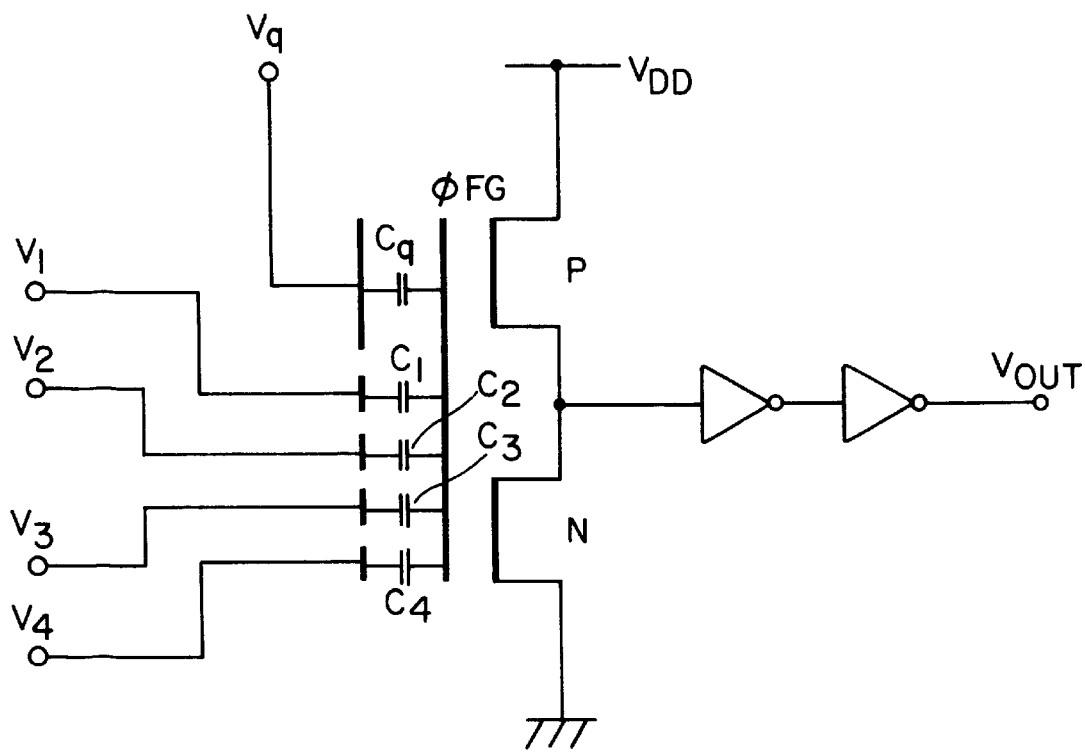
FIG. 16 is a circuit diagram of the seventh embodiment of the present invention.

The circuit of FIG. 16 depicts only the νMOS cell B. The other circuitry is identical to that of embodiment 1 and is omitted here.

The points of difference with the circuitry of FIG. 1 are that the coupling capacity ratio of νMOS cell B is changed, and the value of $V_q$ is altered.

Each coupling capacity ratio is set so that, for example, $$C_1=C_2=C_3=C_4, C_q/C_1=4.5 \qquad (19)$$

In νMOS cell B, by altering the value of $V_q$, it is possible to designate a predetermined number as the number of inputs having a value of '1' necessary to invert the inverter.

The operation of the νMOS cell B of circuit of FIG. 16 will now be explained. The circuitry apart from the νMOS cell B is identical to that of embodiment 1, and an explanation thereof will be omitted here.

Figure 17:
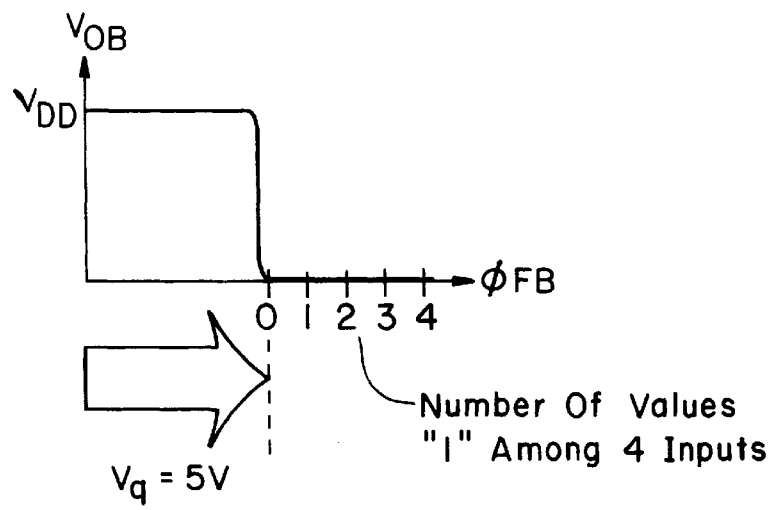
FIG. 17 is a graph showing the basic operational principle of the entirety of the circuitry of the seventh embodiment of the present invention.

First, when 5 V is applied to $V_q$ of the νMOS cell B, the threshold value of the C-νMOS inverter is exceeded no matter what the value of the inputs $V_1$–$V_4$, so that the output of floating gate $\phi_{FB}$ is fixed at a value of '0' (FIG. 17).

Figure 18:
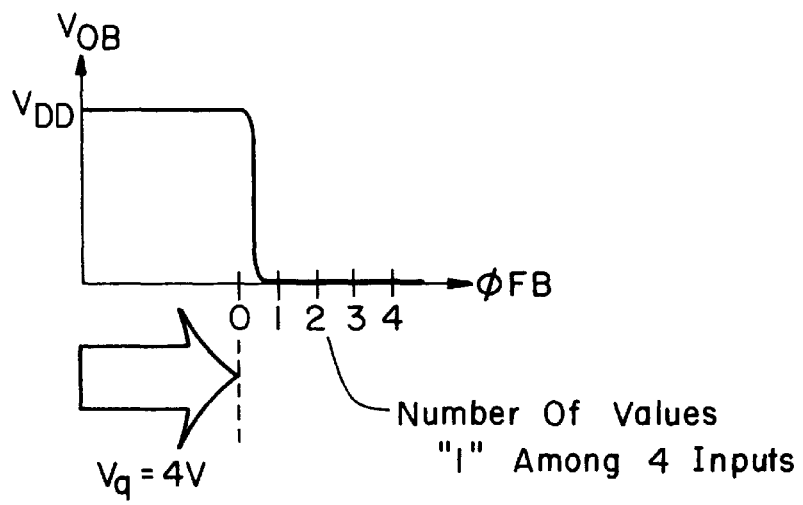
FIG. 18 is a graph showing the basic operational principle of the entirety of the circuitry of the seventh embodiment of the present invention.

As the value of $V_q$ is progressively reduced, when any of $V_1$, $V_2$, $V_3$, and $V_4$ acquire a value of $V_{DD}$, C-νMOS inverter 161 enters an ON state. In this state, the circuit as a whole functions as a winner-take-all circuit which determines the position of the cell having the largest input (FIG. 18).

Figure 19:
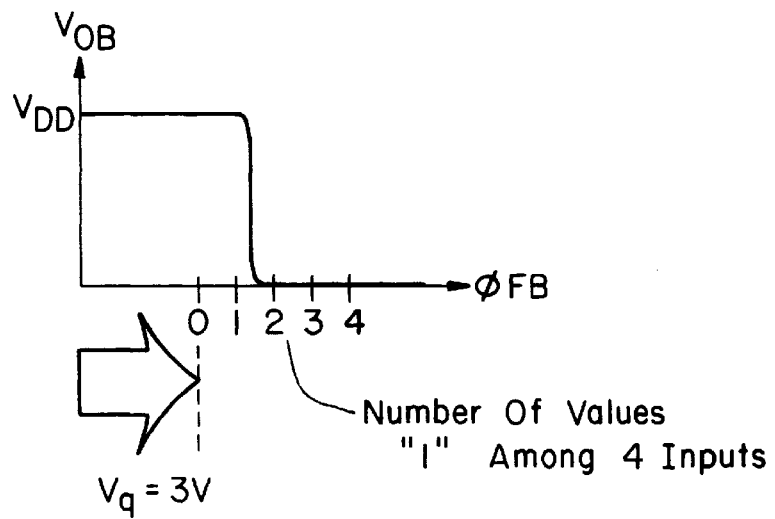
FIG. 19 is a graph showing the basic operational principle of the entirety of the circuitry of the seventh embodiment of the present invention.

When the value of $V_q$ is further reduced, C-νMOS inverter 161 enters an ON state when any 2 of $V_1$, $V_2$, $V_3$, and $V_4$ acquire a value of $V_{DD}$. In this state, the circuit as a whole functions as a winner-take-all circuit which finds the position of the cell having the second largest input signal voltage (FIG. 19).

Figure 20:
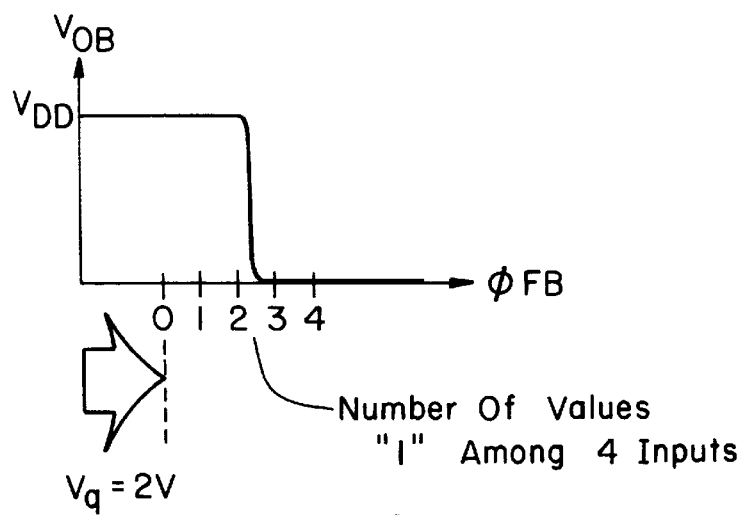
FIG. 20 is a graph showing the basic operational principle of the entirety of the circuitry of the seventh embodiment of the present invention.

When the value of $V_q$ is further reduced, C-νMOS inverter 161 enters an ON state when any 3 of $V_1$, $V_2$, $V_3$, and $V_4$ acquire a value of $V_{DD}$. In this state, the circuit as a whole functions as a winner-take-all circuit which finds the position of the cell having the third largest input signal voltage (FIG. 20).

Figure 21:
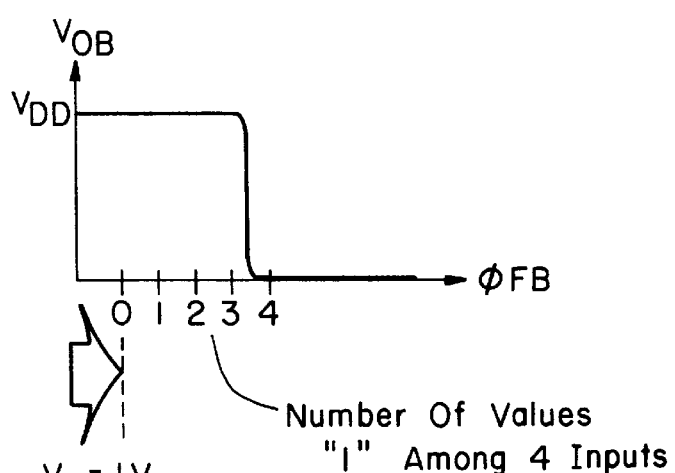
FIG. 21 is a graph showing the basic operational principle of the entirety of the circuitry of the seventh embodiment of the present invention.

When the value of $V_q$ is further reduced, C-νMOS inverter 161 enters an ON state when all 4 of $V_1$, $V_2$, $V_3$, and $V_4$ acquire a value of $V_{DD}$. In this state, the circuit as a whole functions as a winner-take-all circuit which finds the position of the cell having the fourth largest input signal voltage (FIG. 21).

Figure 22:
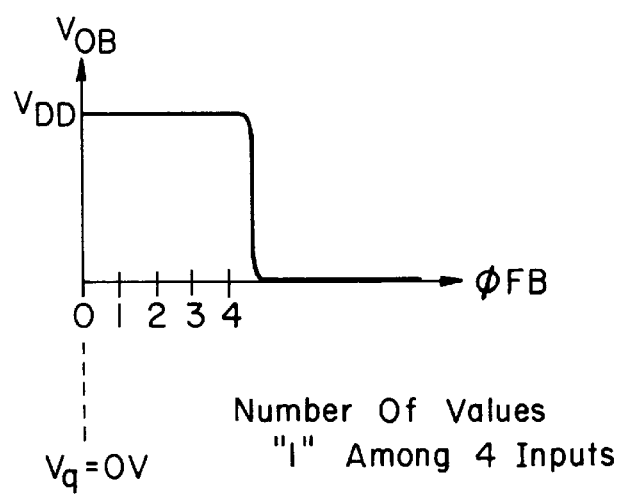
FIG. 22 is a graph showing the basic operational principle of the entirety of the circuitry of the seventh embodiment of the present invention.

When the value of $V_q$ reaches 0 V, the threshold value of the C-νMOS inverter is not exceeded no matter what the value of the inputs $V_1$–$V_4$, so that the output of floating gate $\phi_{FB}$ is fixed at a value of '1' (FIG. 22).

In this way, the operation of the νMbS cell B is determined by $V_q$. Alternatively, these characteristics may be applied not to the resetting of operations but to the tuning of the effective threshold value of the cell.

In this embodiment, as well as in embodiments 2–5 above, a circuit in which an integrator is inserted at the output, and a circuit in which the logic is inverted, are possible.

(Embodiment 8)

Figure 23:
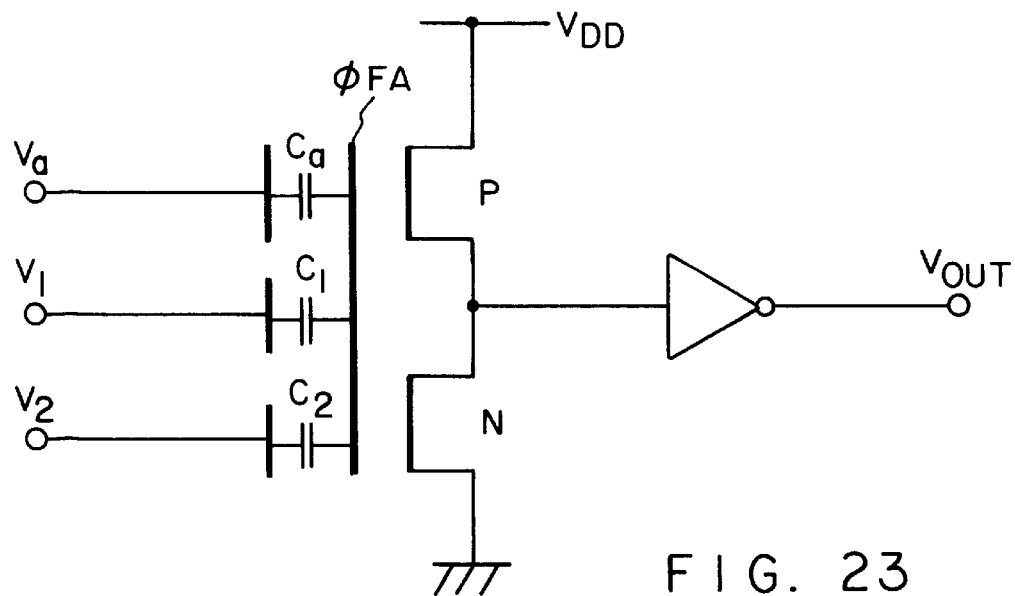
FIG. 23 is a circuit diagram of the eighth embodiment of the present invention.

The circuit of FIG. 23 depicts only a νMOS cell A. The other circuitry is identical to that of embodiment 1, so that it is omitted here.

The points of difference between this circuit and the circuit of FIG. 1 are that the coupling capacity ratio of the νMOS cell A is changed, and the value of $V_a$ is altered.

Each coupling capacity ratio is set so that $C_a$ is larger than in embodiment 1. For example, the design may be simply such that $$C_1=C_2, C_a/C_1=2.5 \qquad (20)$$

This νMOS cell A may achieve operation identical to that of the νMOS cell A of embodiment 1 by altering the value of $V_a$.

The operation of the νMOS cell A of the circuit of FIG. 23 will now be explained.

Figure 24:
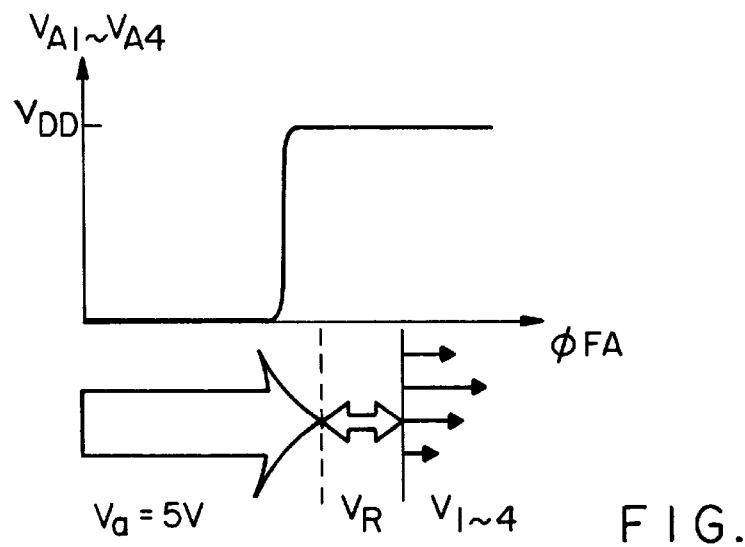
FIG. 24 is a graph showing the basic operational principle of the entirety of the circuitry of the eighth embodiment of the present invention.

First, when a value of 5 V is applied to $V_a$ of the νMOS cell A, the threshold value of the C-νMOS inverter is exceeded no matter what the value of the inputs $V_1$ and $V_2$, so that the output of the floating gate $\phi_{FA}$ is fixed at '1' (FIG. 24).

Figure 25:
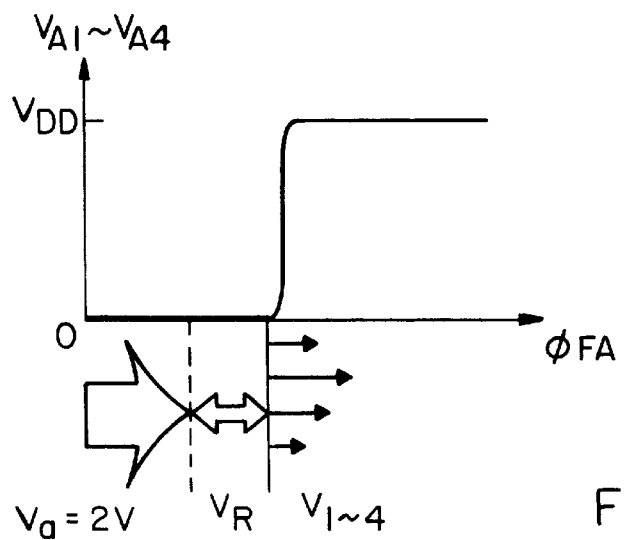
FIG. 25 is a graph showing the basic operational principle of the entirety of the circuitry of the eighth embodiment of the present invention.

As the value of $V_a$ is progressively reduced, when a state such as that in FIG. 25 is reached, the circuit functions in a manner identical to that of the νMOS cell A of embodiment 1.

Figure 26:
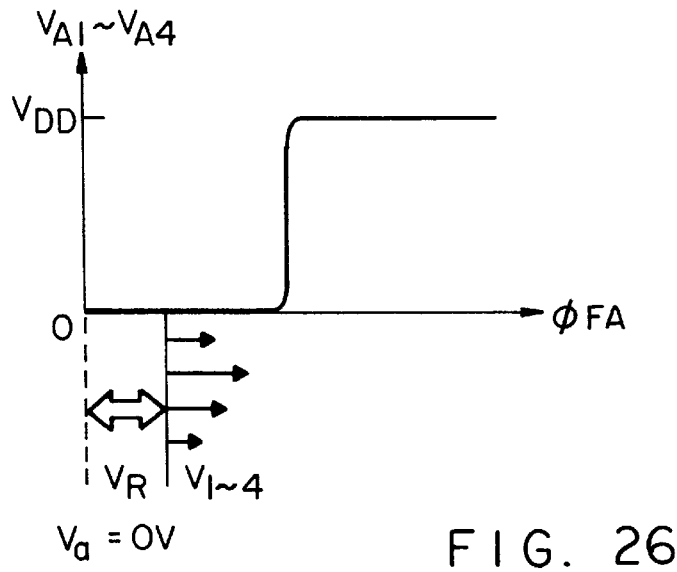
FIG. 26 is a graph showing the basic operational principle of the entirety of the circuitry of the eighth embodiment of the present invention.

When the value of $V_a$ reaches 0 V, the threshold value of the C-νMOS inverter will not be exceeded no matter what the value of the inputs $V_1$ and $V_2$, so that the output of the floating gate $\phi_{FA}$ is fixed at '0' (FIG. 26).

In this manner, it is possible to determine the operation of the νMOS cell A by means of $V_a$. These characteristics may alternatively be applied not to the resetting of the operation but rather to the tuning of the effective threshold value of the cell. Furthermore, by applying unrelated random noise to the $V_a$ terminal of each νMOS cell, it is possible to conduct stochastic operation. By proceeding in this manner, applications are possible to data processing close to that of living organisms. This type of random system may be applied, for example, to the $V_q$ terminal of FIG. 16.

In this embodiment as well, as in the embodiments 2–8 described above, a circuit in which an integrator is inserted at the output, and a circuit in which the logic is inverted, and the like, are possible.

(Embodiment 9)

A ninth embodiment of the present invention will be explained using the circuit diagram of FIG. 27.

Figure 27:
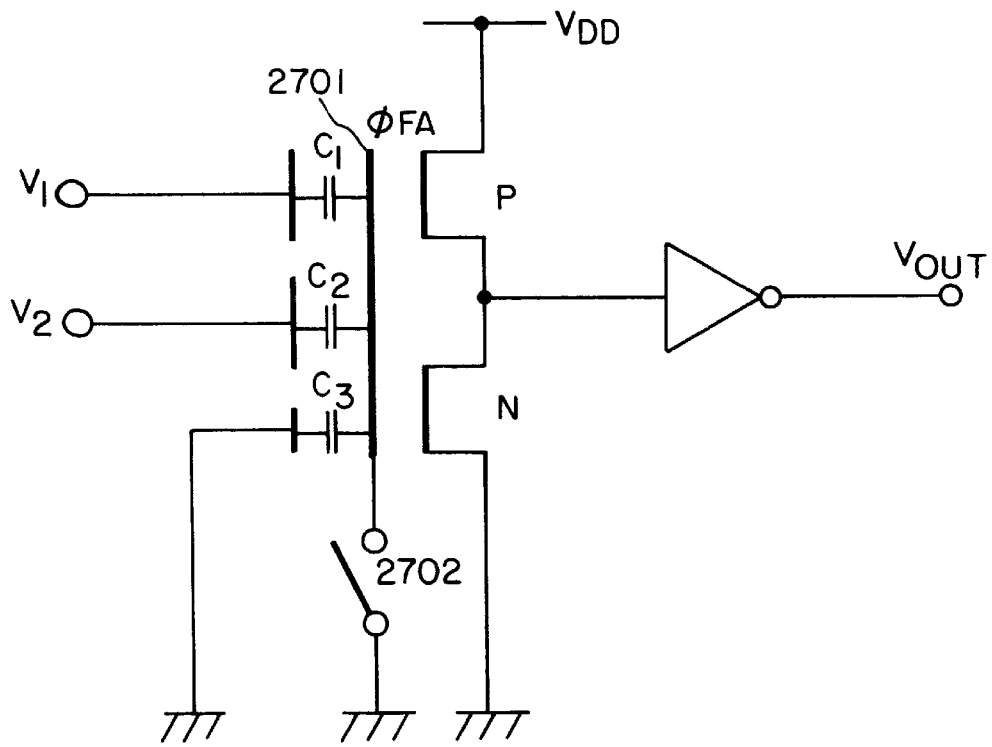
FIG. 27 is a circuit diagram of the ninth embodiment of the present invention.

The circuit of FIG. 27 depicts only a νMOS cell A. The other circuitry is identical to that of embodiment 1, and is omitted here.

The point of difference between this circuit and the circuit of FIG. 1 is that a switch 2702 is attached as shown in FIG. 27 in order to set the internal charge of the floating gate 2701 of νMOS cell A to a specified initial value. When this switch is closed, $V_1$ and $V_2$ are set to 0 V. Where necessary, these values may of course be changed to other values.

The basic operation of νMOS cell A of the circuit of FIG. 27 is identical to that of embodiment 1, so that an explanation thereof is omitted here.

It is of course the case that the switch which serves to reset the floating gate in this manner may be attached in the same way to a νMOS cell B.

(Embodiment 10)

Figure 28:
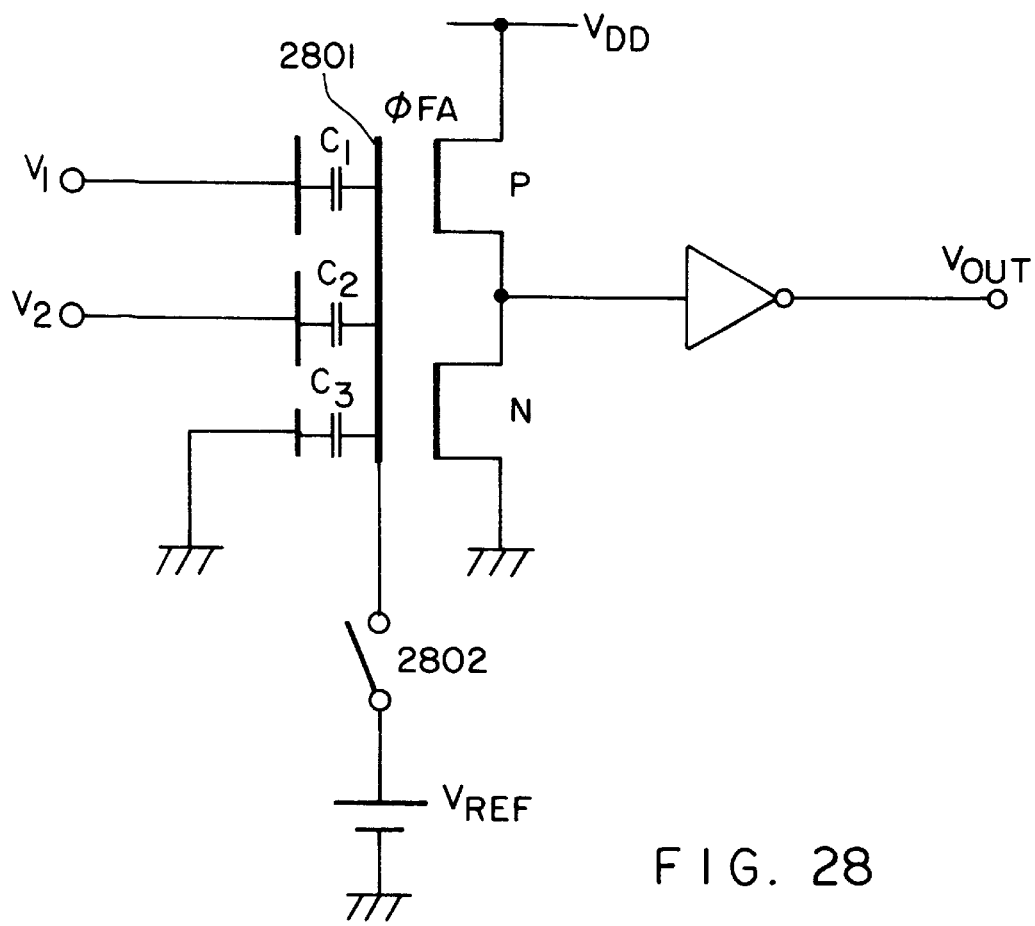
FIG. 28 is a circuit diagram of the tenth embodiment of the present invention.

A tenth embodiment of the present invention will be explained using FIG. 28. The circuit of FIG. 28 shows only the νMOS cell A. The other circuitry is identical to that of embodiment described above, and a description thereof is omitted here.

The point of difference between this circuit and the circuit of FIG. 1 is that a switch 2802 is attached as shown in FIG. 28; this serves to set the charge within the floating gate 2801 of νMOS cell A to a specified initial value. For example, when the switch is closed, the following results:

$$(C_1V_1+C_2V_2)/C_{TOT}=V_{REF} \quad (21)$$

After switch 2802 has been turned OFF and a specified signal has been entered into $V_1$ and $V_2$, then the output of νMOS cell A only attains a value of 1 when the following conditions are fulfilled:

$$(C_1V_1+C_2V_2)/C_{TOT}>V_{REF} \quad (22)$$

If $V_{REF}$ is set equal to $V_{DD}/2$, then the operation is completely identical to that of the first through eighth embodiments. However, $V_{REF}$ may of course be set to other values. By proceeding in this manner, it is possible to set the inversion threshold value of the νMOS inverter to a freely selected value.

The basic operation of νMOS cell A of the circuit of FIG. 28 is identical to that of embodiment 1, so that an explanation thereof is omitted.

It is of course the case that this type of switch which serves to reset the floating gate may be attached in the same manner to the νMOS cell B. If the value of $V_{REF}$ in the νMOS cell B is altered, it is of course possible to alter the number of the winner.

(Embodiment 11)

Figure 40:
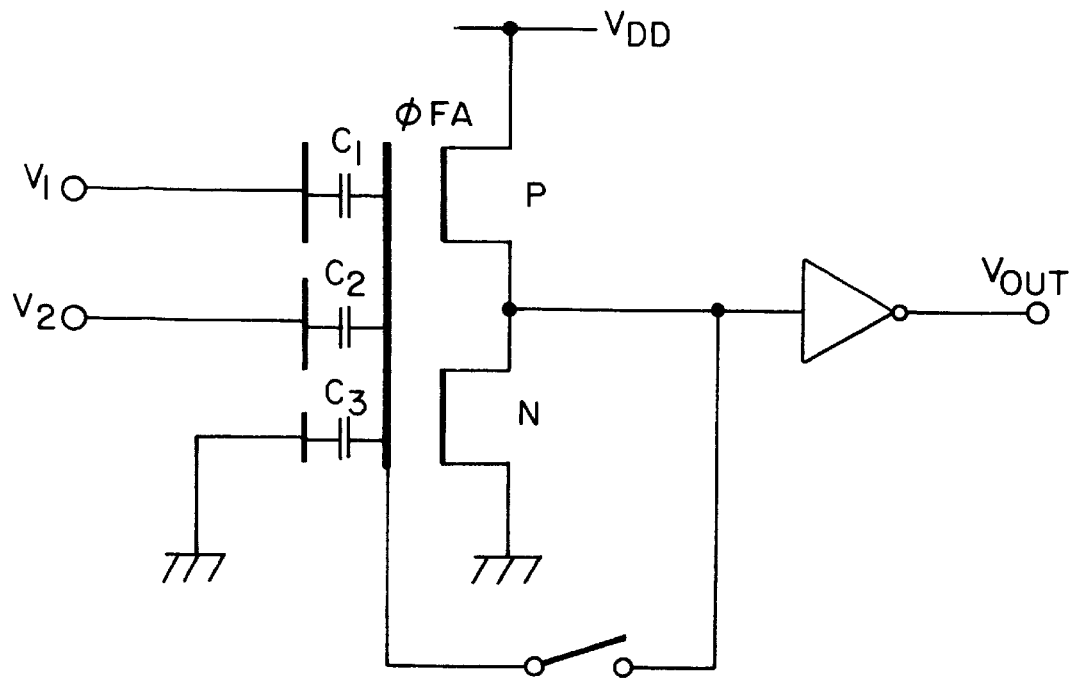
FIG. 40 is a circuit diagram showing an eleventh embodiment of the present invention.

An eleventh embodiment of the present invention will be explained using FIG. 40.

In embodiment 10, the floating gate was directly connected to a direct current source termed $V_{REF}$; however, this may also be connected to, for example, the output of the νMOS inverter.

By proceeding in this manner, the νMOS inverter is automatically biased to the inversion voltage, so that it is possible to conduct extremely precise threshold operations.

(Embodiment 12)

A twelfth embodiment of the present invention will be explained using the circuit diagram of FIG. 29.

Figure 29:
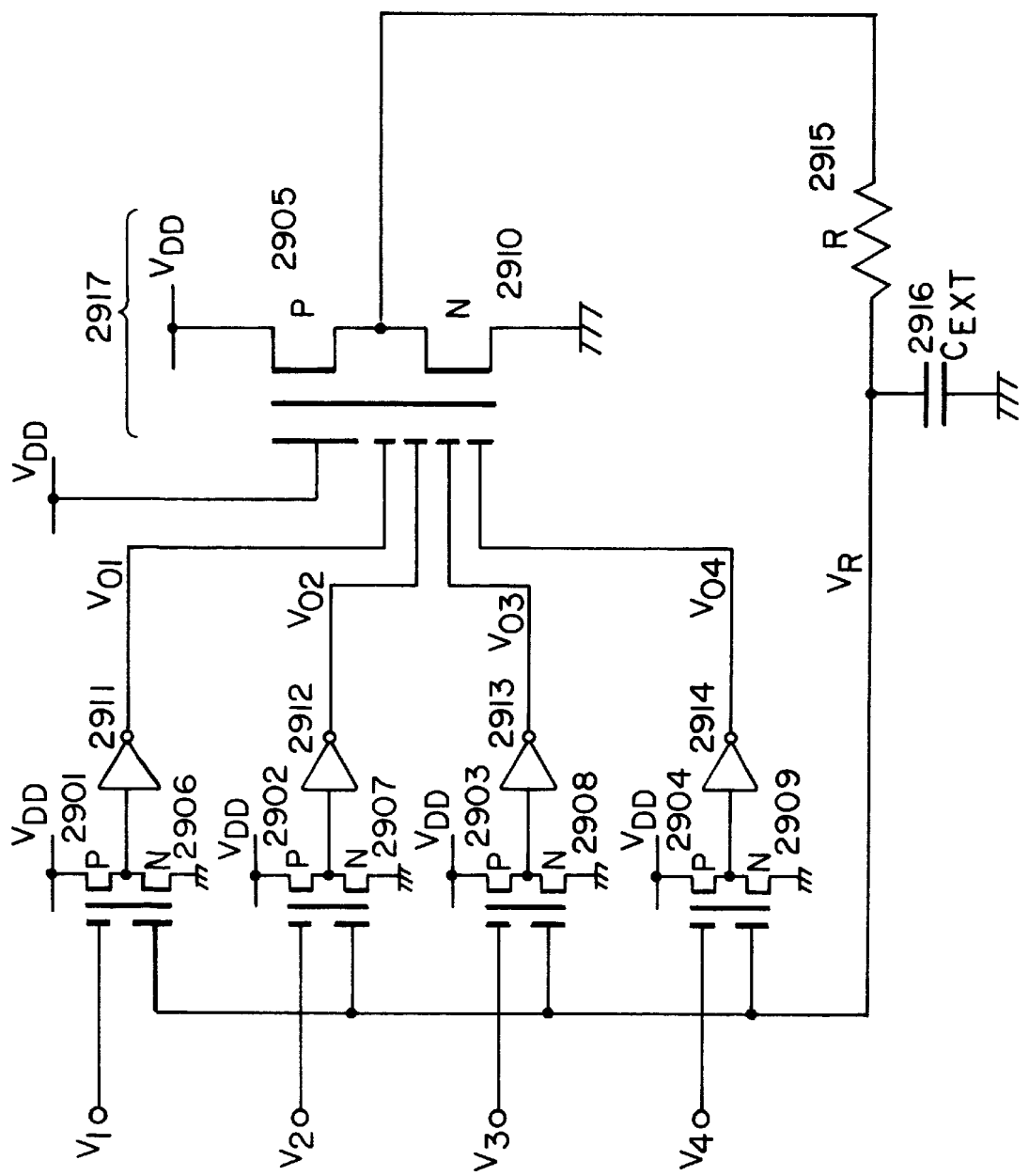
FIG. 29 is a circuit diagram of the twelfth embodiment of the present invention.

The circuit of FIG. 29 has 4 outputs $V_{O1}$, $V_{O2}$, $V_{O3}$, and $V_{O4}$, which correspond to the 4 input signals $V_1$, $V_2$, $V_3$, and $V_4$; only that output corresponding to the largest input has a value of '1', while the other inputs all have a value of '0'. The greatest difference between this embodiment and embodiments 1 through 10 is that it is possible to designate the input having the largest value without entering the oscillation state. In this embodiment, the number of inputs is limited to 4 to simplify the explanation; however, it is of course the case that any number of inputs may be employed.

In FIG. 29, references 2901–2905 indicate P channel neuron MOS transistors, while references 2906–2910 indicate N channel neuron MOS transistors. References 2911–2914 indicates standard inverter circuits.

The points of difference between this circuit and circuit of FIG. 1 are that there is no grounded capacity of the νMOS cell A, the coupling capacity ratio of $V_{IN\ and\ VR}$ is different, there are no inverters present ahead of νMOS cell B, and a integrator (phase compensator circuit) comprising R (2915) and C (2916) is added to the feedback loop.

The design method of this circuit is as follows.

Figure 30:
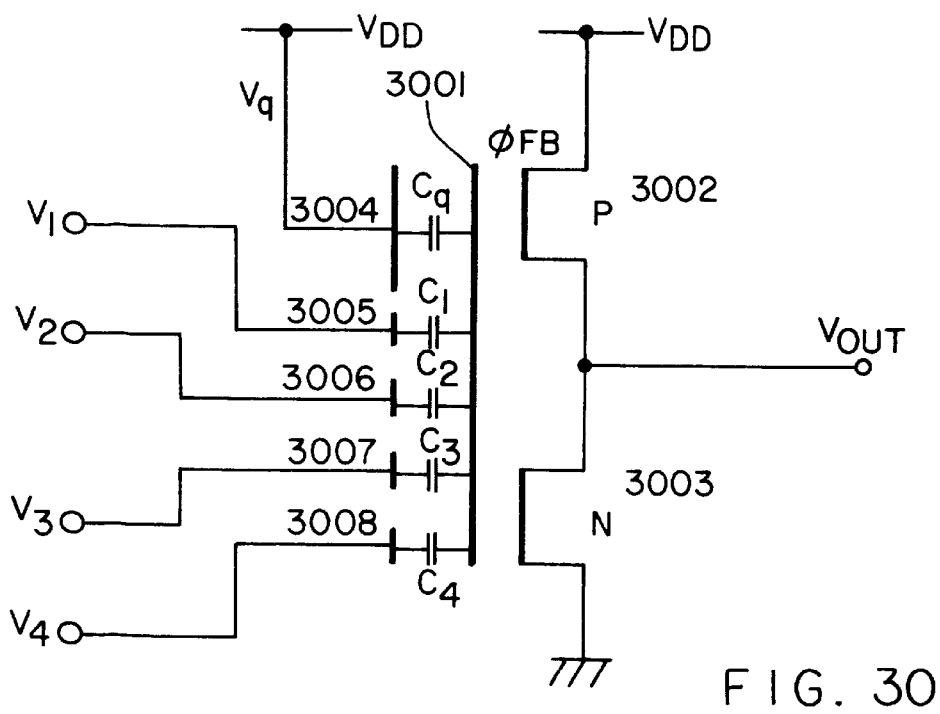
FIG. 30 is a diagram from which the latter stage portion of the circuitry of FIG. 29 has been removed.

In the circuit of FIG. 30, the latter stage portion 2917 is removed in order to explain the operation of the circuit of FIG. 29.

Reference 3001 indicates the floating gate; this gate is common to 2 νMOS (3002, 3003). References 3004–3008 are input gates, and $C_q$, $C_1$, $C_2$, $C_3$, and $C_4$ indicate capacitive coupling coefficients between these gates and the floating gate.

5 signal voltages, $V_q$, $V_1$, $V_2$, $V_3$, and $V_4$, are inputted into this circuit; $V_1$, $V_2$, $V_3$, and $V_4$ are signal voltages which change together in a freely selected manner over time, and are input voltages from νMOS cells A. $V_q$ is a signal voltage which regulates the operation of the circuit; it may be set to, for example, the power source voltage $V_{DD}$.

The capacitive coupling ratio with respect to each input is identical to that of the νMOS cell B of embodiment 1. The point of difference between this νMOS cell B and that of embodiment 1 is that the standard inverter is removed. By means of this, the output gain of the νMOS cell B is reduced, and oscillation is effectively suppressed.

However, when the number of inputs of the circuits is increased, multiple stages of standard inverters may be applied in a manner identical to that of FIG. 5. Since the output does not change greatly even if one input changes, by providing multiple stages, it is possible to increase the voltage gain. At this time, the number of stages of inverter added should be such as not to produce oscillation. Alternatively, the inverters may be placed in a cascade structure and the output impedance thereby increased.

Figure 41:
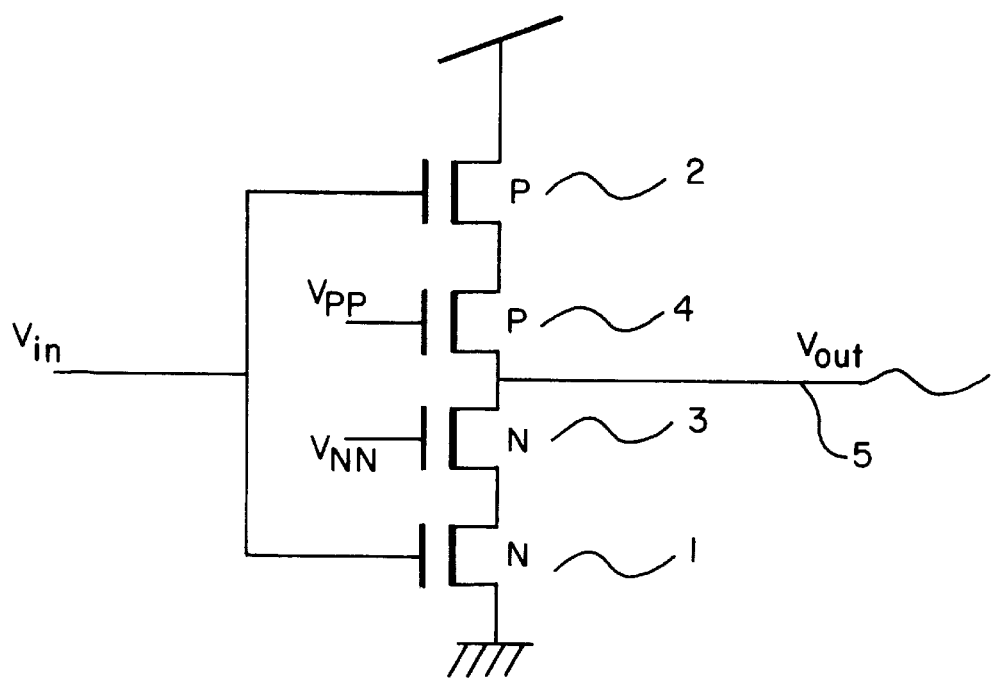
FIG. 41 is an example showing the case in which the inverter in the latter stage portion of the circuitry of FIG. 29 is given a cascade structure.

An example thereof is shown in FIG. 41. In addition to the NMOS ① and PMOS ② comprising the CMOS, the output terminal ⑤ is extracted via an NMOS ③ and PMOS ④ which apply a direct current bias to the gate electrode. By means of regulating the values of $V_{NN}$ and $V_{PP}$, it is possible to make the output impedance sufficiently large and to stop oscillation. Only one stage may be employed, or alternatively, 2 or more stages may be employed. Furthermore, this may be combined with standard inverters.

Figure 31:
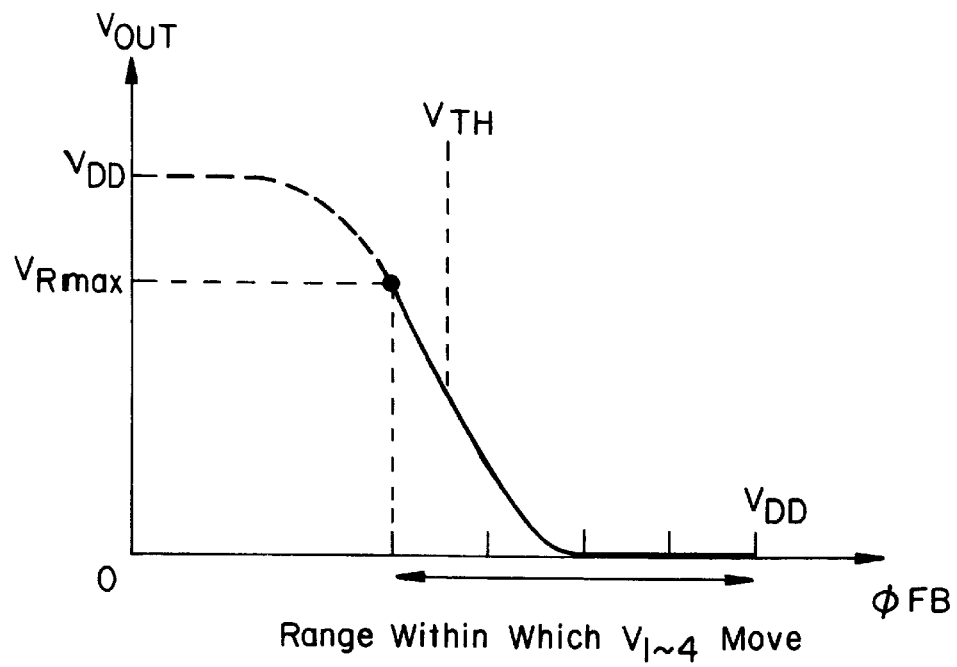
FIG. 31 is a graph showing the relationship between the floating gate potential and the output in FIG. 30.

FIG. 31 shows the relationship between the floating gate potential and the output in the circuit of FIG. 30. Here, if $V_1$–$V_4$ oscillate between 0 and 5 V, then the output changes as shown by the solid line in the figure. That is to say, it can be seen that the output does not oscillate over the entire range of 0–5 V. Here, the maximum value of the output of the circuit is designated $V_{Rmax}$.

Figure 32:
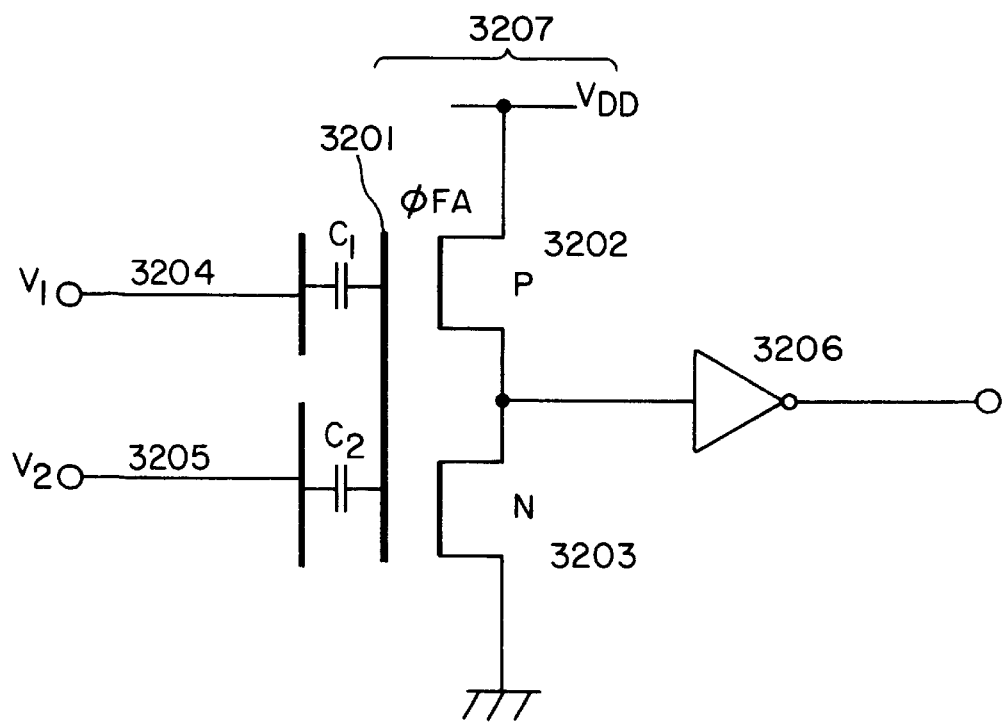
FIG. 32 is a diagram from which the previous stage portion of the circuitry of FIG. 29 has been removed.

In FIG. 32, the previous stage portion of the circuit of FIG. 29 is removed in order to facilitate the explanation of the operation of the circuit. Reference 3201 indicates a floating gate; this gate is common to the 2 vMOS (3202, 3203). References 3204 and 3205 indicate input gates; the capacitive coupling coefficients between these gates and the floating gate are represented by, respectively, $C_1$ and $C_2$.

Two signal voltages $V_1$ and $V_2$ are inputted into this circuit;

$V_1$ and $V_2$ are signal voltages which change together over time in a freely selected manner. Reference 3206 indicates a standard inverter circuit. The circuitry of reference 3207 is a variable threshold value inverter circuit in which, in the same manner as the vMOS cell A of embodiment 1, the threshold value changes depending on $V_2$ when viewed from $V_1$.

The capacitive coupling ratios with respect to the inputs is determined as given below.

The capacitive coupling ratio with respect to each input are determined as follows. That is to say, the capacitive coupling ratios in the vMOS cell A are determined so that the following results:

$$C_2/C_1=3/2 \tag{23}$$

It is of course the case that where necessary, this value may be modified. In this case, it is important that $C_2$ be larger than $C_1$. However, in some cases, $C_2$ may be equal to $C_1$, or $C_2$ may be smaller than $C_1$.

The operation of the vMOS cell A designed in this manner will now be explained.

If the potential of floating gate 121 is represented by $\phi_{FA}$, then the following results:

$$\phi_{FA}=(C_1V_1+C_2V_2)/C_{TOT} \tag{24},$$

and when $\phi_{FA}$ becomes larger than the inversion voltage $V_{TH}$ of the inverter as seen from the floating gate, that is to say, when the following is true:

$$(C_1V_1+C_2V_2)/C_{TOT}>V_{TH} \tag{25},$$

inverter 128 enters an ON state and the output thereof is inverted. Here, if the ratio of $C_1$ and $C_2$ is substituted into the above formula, then the following formula results:

$$(2V_1+3V_2)/5>V_{TH} \tag{26}.$$

Here, $V_1$ moves within a range of 0–5 V. $V_2$ may be moved within a range of 0–$V_{Rmax}$.

Here, the maximum value $V_{Rmax}$ of the output of vMOS cell B is set to 3 V. If $V_1=0$ V, then the C-vMOS inverter 3207 will not invert even if $V_2$ attains its maximum value ($V_2=V_{Rmax}=3$ V). Furthermore, if $V_2=0$ V, then the C-vMOS inverter 3207 will not invert even if $V_1V_{DD}$.

The operation is similar to that of vMOS cell A of embodiment The operation of the circuit as a whole is fundamentally identical to that of embodiment 1; however, by means of inserting a phase compensator circuit into the feedback portion, it is possible to obtain a non-oscillating output by setting R and $C_{EXT}$ to appropriate values.

Figure 33:
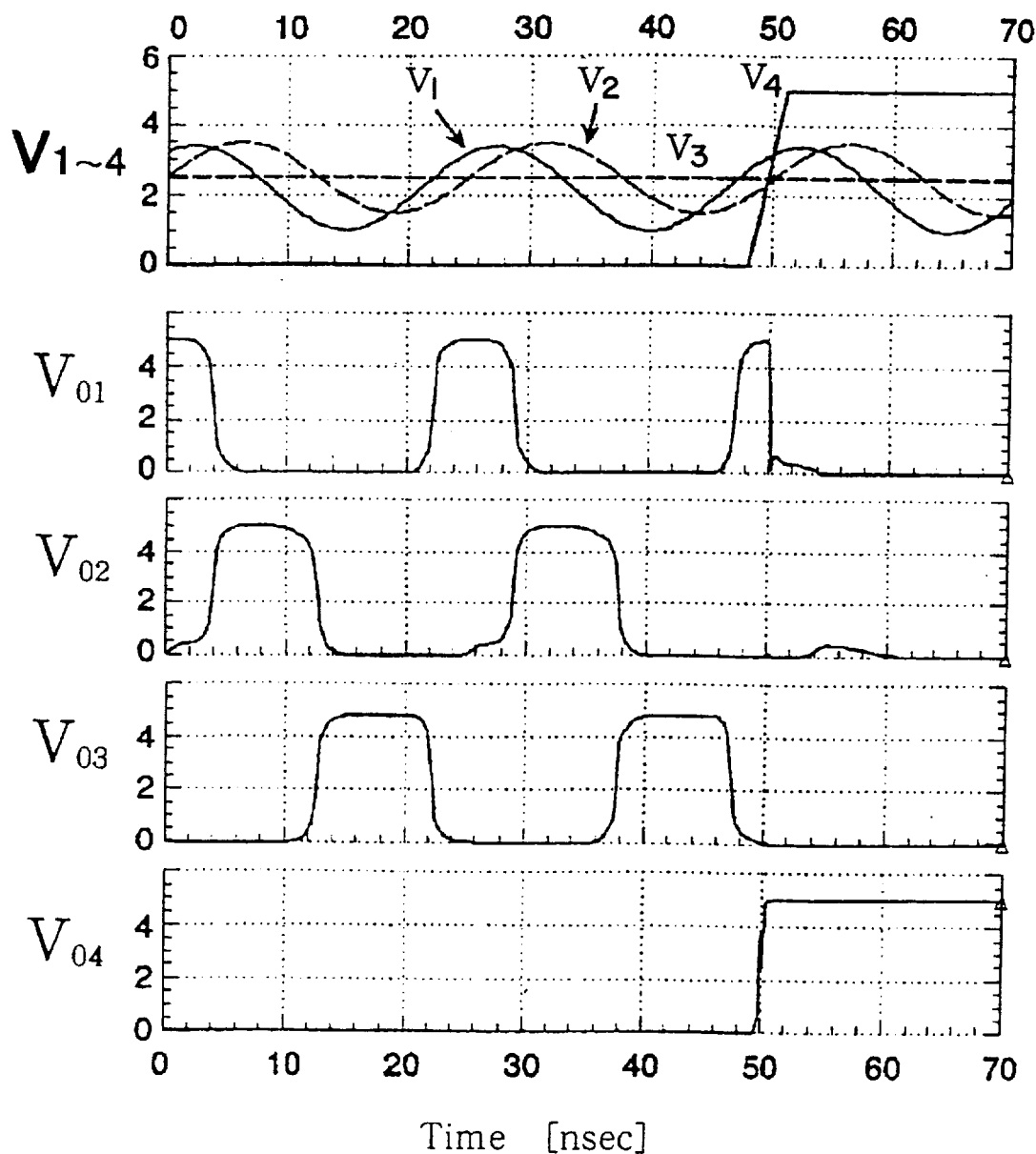
FIG. 33 is a diagram showing the output waveform obtained in a simulation of the circuitry of the twelfth embodiment of the present invention using a circuit simulator.

FIG. 33 shows an output waveform obtained using the circuit simulator HSPICE. The uppermost waveform is the input waveform, while the lower waveforms are the various output waveforms. It can be seen that only the output of that cell having the largest input signal increases, so that the circuit functions as a winner-takes-all circuit. Furthermore, since there is no oscillation of the output as shown in FIG. 33, the power consumption which accompanies the charging and discharging of the capacitors is not present, and it is thus possible to reduce the amount of power consumed.

It is not the case that R and $C_{EXT}$ are absolutely necessary in the phase compensator of the feedback portion.

Figure 34:
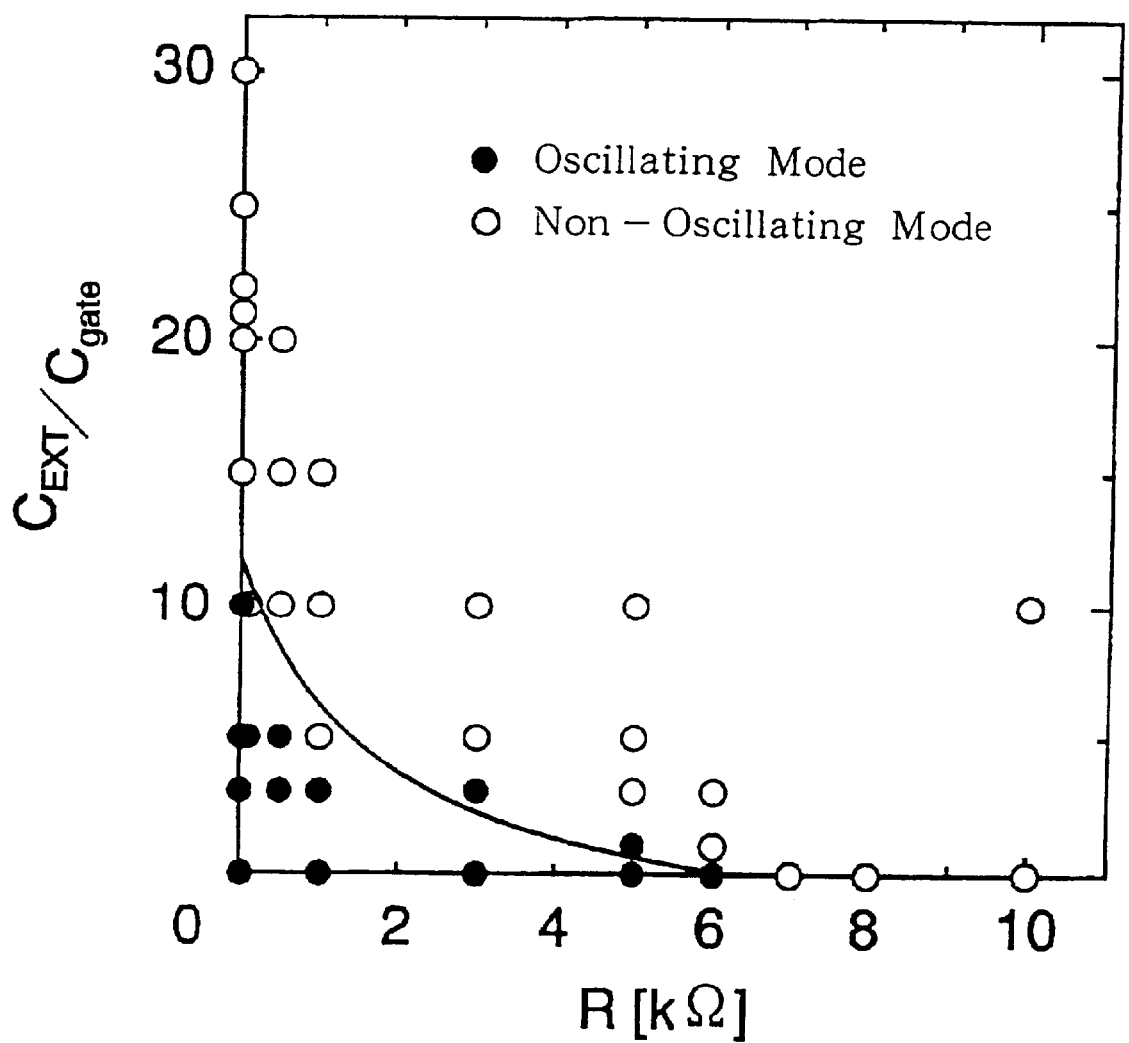
FIG. 34 is a diagram in which R is plotted along the horizontal axis and $C_{EXT}/C_{gate}$ is plotted along the vertical axis, which shows whether the output oscillates or not.

In FIG. 34, the output is shown as oscillating or non-oscillating with R along the horizontal axis and $C_{EXT}/C_{gate}$ on the vertical axis. $C_{gate}$ is the gate capacity of the inverter. The black circles indicate oscillating values, while the white circles indicate non-oscillating values. In this figure, it can be seen that even if R has a value of 0, a non-oscillating state will be reached if $C_{EXT}/C_{gate}$ is sufficiently large. $C_{EXT}/C_{gate}$ corresponds to the number of inputs; that is to say, if the number of inputs is increased, this circuit will reach a non-oscillating output state even if R is not inputted.

FIG. 35 shows the response time of the output when the largest input is changed, measured using R as a parameter. $C_{EXT}/C_{gate}$ is plotted along the horizontal axis, while the response time is plotted along the vertical axis. One input waveform is fixed at 2.5 V, while the other is caused to change from 2 V to 3 V in the space of 2 nsec. The delay time of the output is defined as the time from the point at which the inputs cross to the time at which the output changes. Even when $C_{EXT}/C_{gate}=6,000$, that is to say, even in a winner-take-all circuit having 6,000 cells, a maximum delay value of only 0.2 nsec was detected, so that extremely high speed operation has been realized.

In this embodiment as well, as in the embodiments 2–8 described above, a circuit is possible in which an integrator is inserted at the output, and a circuit is also possible in which the logic is inverted.

Figure 42:
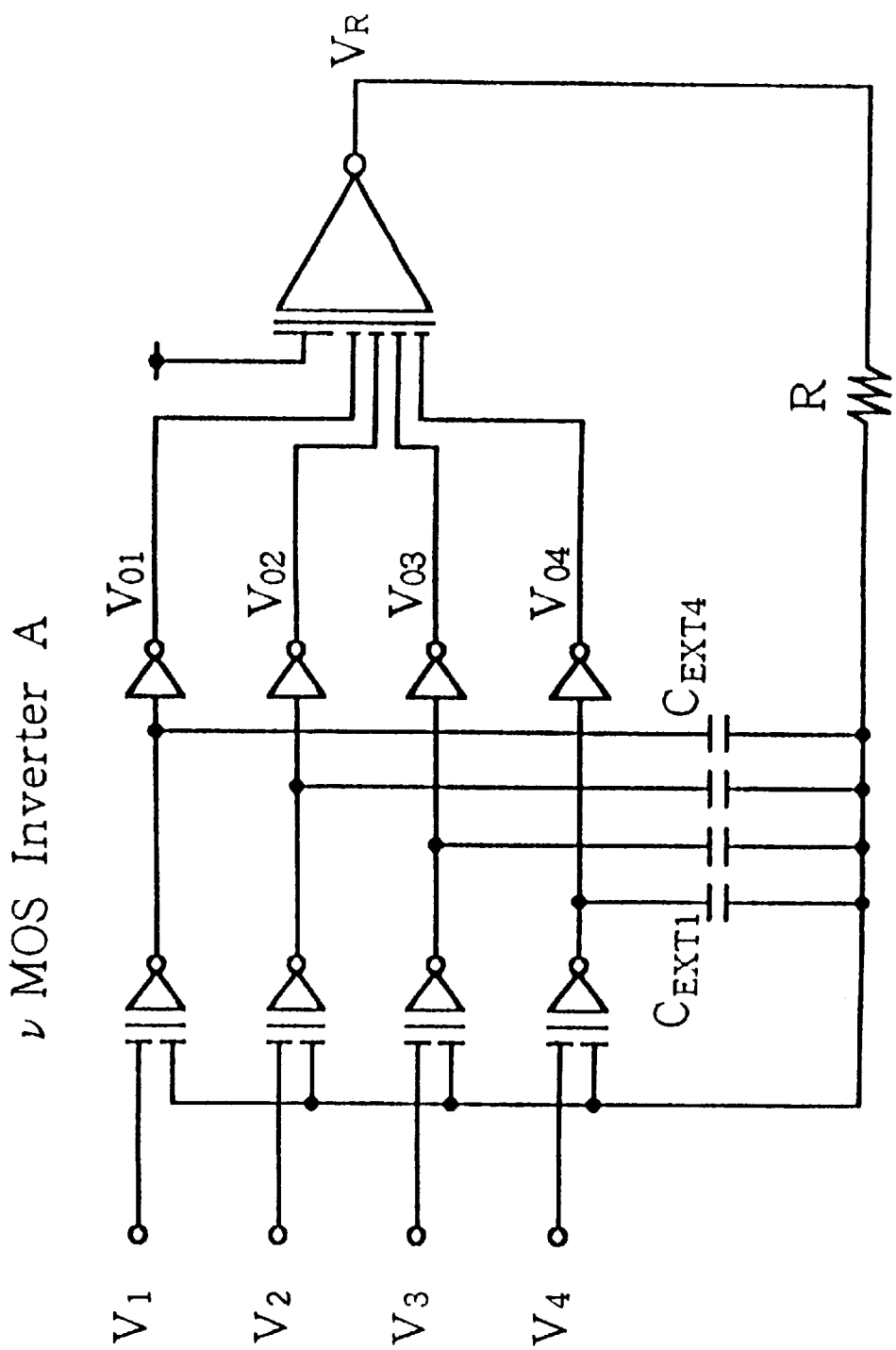
FIG. 42 is a circuit diagram of the thirteenth embodiment of the present invention.

(Embodiment 13) A thirteenth embodiment of the present invention is shown in FIG. 42.

In this embodiment, the effect of $C_{EXT}$ is increased by not grounding $C_{EXT}$ as in the circuit of embodiment 12 but connecting this to the output of each vMOS inverter A.

(Embodiment 14)

A fourteenth embodiment of the present invention will be explained using the circuit diagram of FIG. 36.

The point of difference between this circuit and the circuit of FIG. 1 is that a operational amplifier (OP-Amp) is used in place of the inverter.

Figure 36:
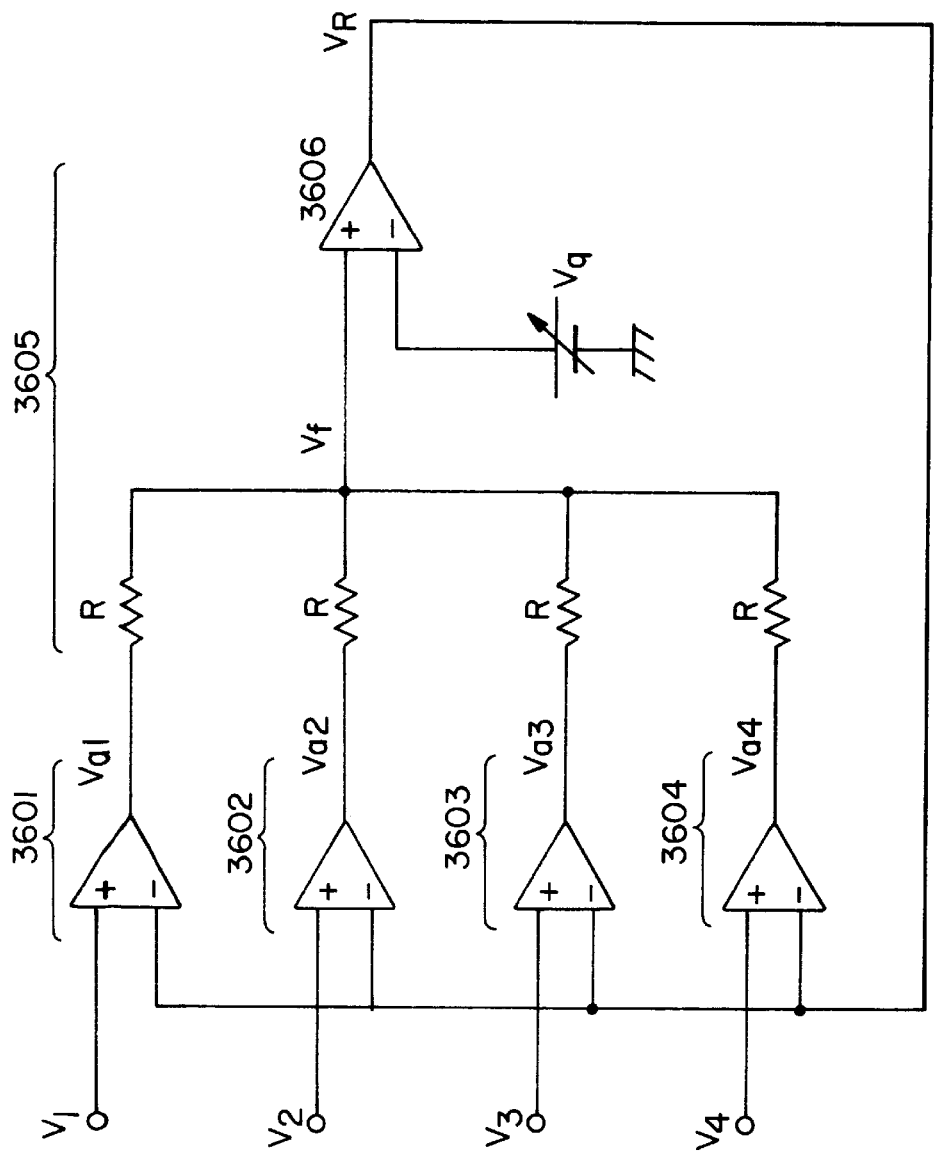
FIG. 36 is a circuit diagram showing a fourteenth embodiment of the present invention.
Figure 37:
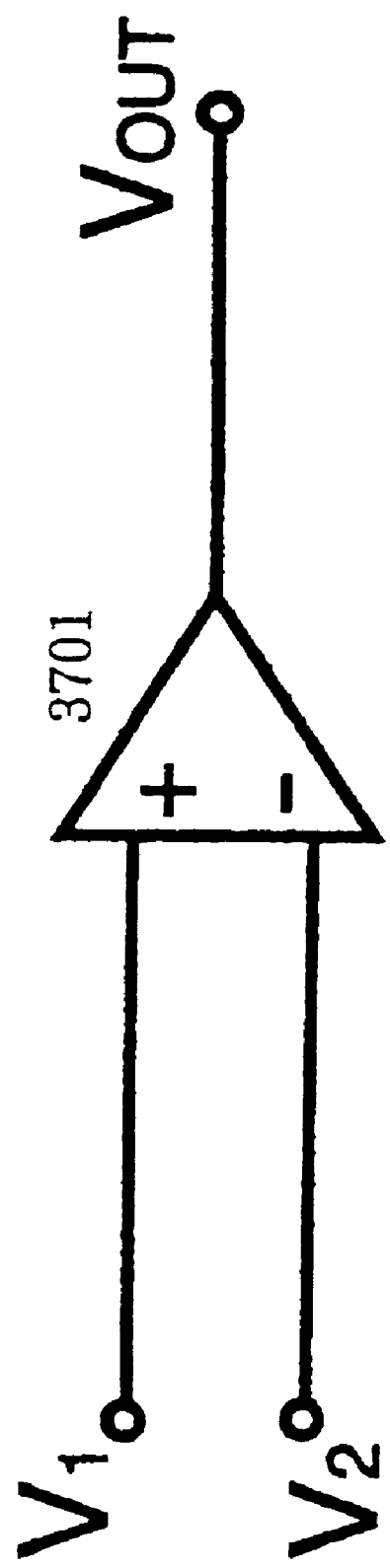
FIG. 37 is a diagram from which the previous stage portion of the circuitry of FIG. 36 has been removed.

In FIG. 37, the previous stage portion (3601–3604) of the circuit of FIG. 36 is removed in order to facilitate an explanation of the operation of this circuit.

Two signal voltages $V_1$ and $V_2$ are inputted into this circuit; these signal voltages change together over time in a freely selected manner. The power source voltages $V_+$ and $V_-$ serve to drive OP-Amp; these are, for example, such that $V_+=15$ V, and $V_-=-15$ V. In FIG. 37, $V_+$ and $V_-$ are omitted. This circuit outputs a value of '1' when $V_1>V_2$, and outputs a value of '0' when $V_1<V_2$. This is termed OP-Amp cell A.

The output voltages corresponding to the '1', '0' which are the outputs of the OP-Amp 3701 are commonly $V_+$ and $V_-$; however, these voltages are not necessarily restricted to this combination. Hereinbelow, the output voltages corresponding to '1' and '0' are, respectively, $V_+$ and $V_-$.

Figure 38:
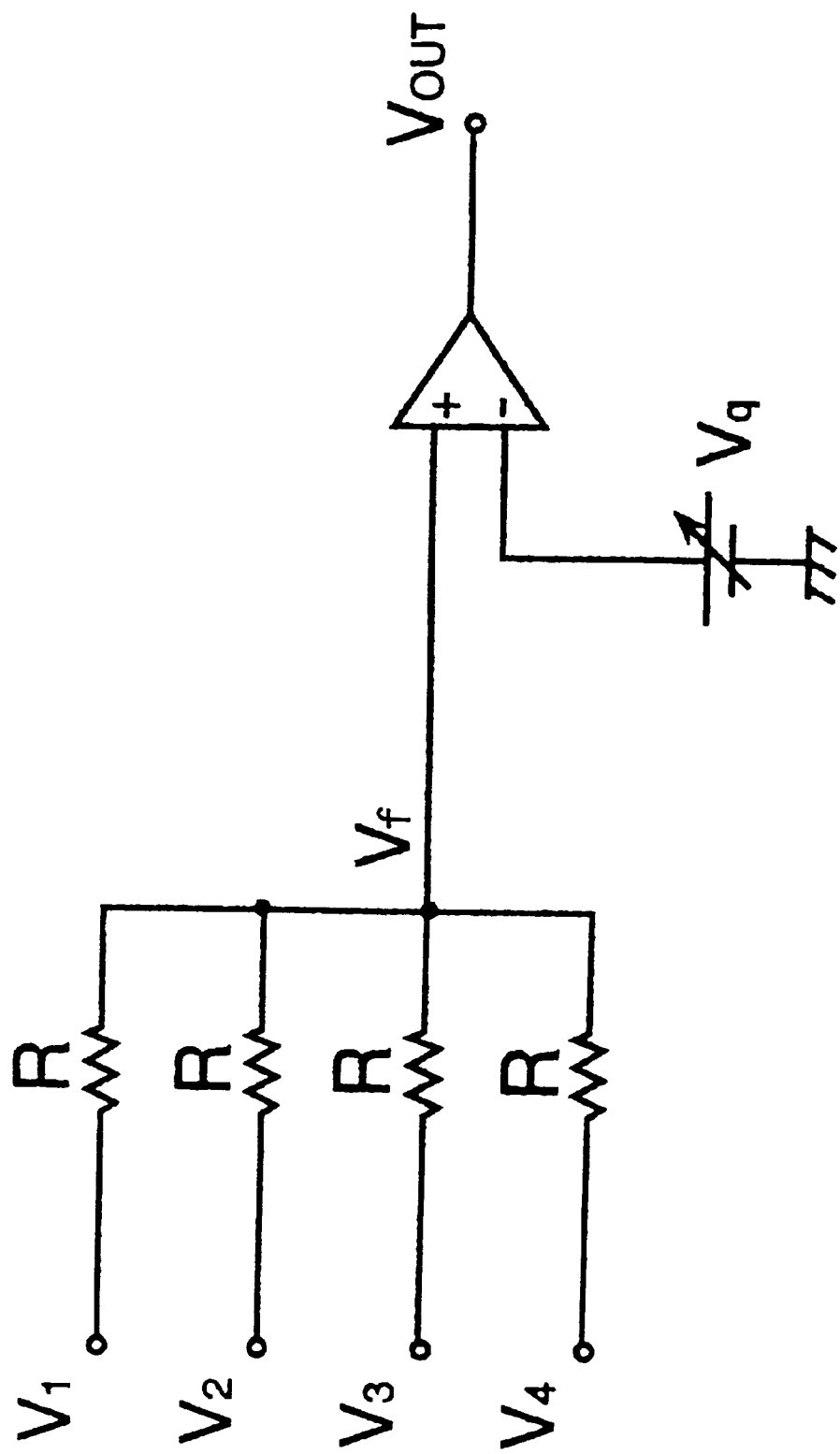
FIG. 38 is a diagram from which the latter stage portion of the circuitry of FIG. 36 has been removed.

In FIG. 38, the latter stage portion 3605 of the circuit of FIG. 36 is extracted in order to facilitate an explanation of the operation of the circuit.

Five signal voltages, $V_q$, $V_1$, $V_2$, $V_3$, and $V_4$ are inputted into this circuit; $V_1$, $V_2$, $V_3$, and $V_4$ are signal voltages which change together over time, and are the output voltages of the OP-Amp cells A described above, inputted via resistors. $V_q$ is a signal voltage which regulates the operation of the circuit. The circuit makes a determination as to whether a value of '1' is present among the inputs or not. This is termed OP-Amp cell B.

The $V_q$ signal voltage is determined in the following manner.

$$V_-<V_q<(3V_-+V_+)/4 \tag{27}$$

With respect to the input voltages of the OP-Amp cell B 3605, the signal voltage inputted into OP-Amp 3606 as $V_{in+}$ is as follows:

$$V_{in+} = (V_1 + V_2 + V_3 + V_4)/4 \tag{28}$$

so that when $V_1$, $V_2$, $V_3$, and $V_4$ all have a value of '0', that is to say, when $V_{in+} < V_q$, the output of OP-Amp cell B is '0', while when any of the inputs have a value of '1', that is to say, when $V_{in+} > V_q$, the output of OP-Amp cell B 3605 has a value of '1'.

As is shown in FIG. 36, if the output of OP-Amp cell B 3605 is fed back to the input of OP-Amp cells A 3601–33604, this circuit becomes a negative feedback oscillator. The operation of this circuit is identical to that of FIG. 1.

In FIG. 36, a 4 input winner-take-all circuit is depicted; however, it is of course the case that any number of inputs may be employed.

In the same manner as the circuit of FIG. 29, it is of course the case that it is possible to insert an integrator into the feedback loop and thus to stabilize the operation of the circuit.

(Embodiment 15)

A winner-take-all circuit (WTA circuit) having a multi-stage structure will be explained as a fifteenth embodiment of the present invention.

When the input voltages are extremely close to one another, it is possible to increase the difference between the input voltages by passing these through a WTA circuit and using the voltage of the winner as a standard (a freely selected voltage may be made the standard). Using this, the WTA circuit may be used as a pre-amp, and by assembling a number of stages of WTA circuits, it is possible to increase the precision of input voltage demarcation.

Figure 43A:
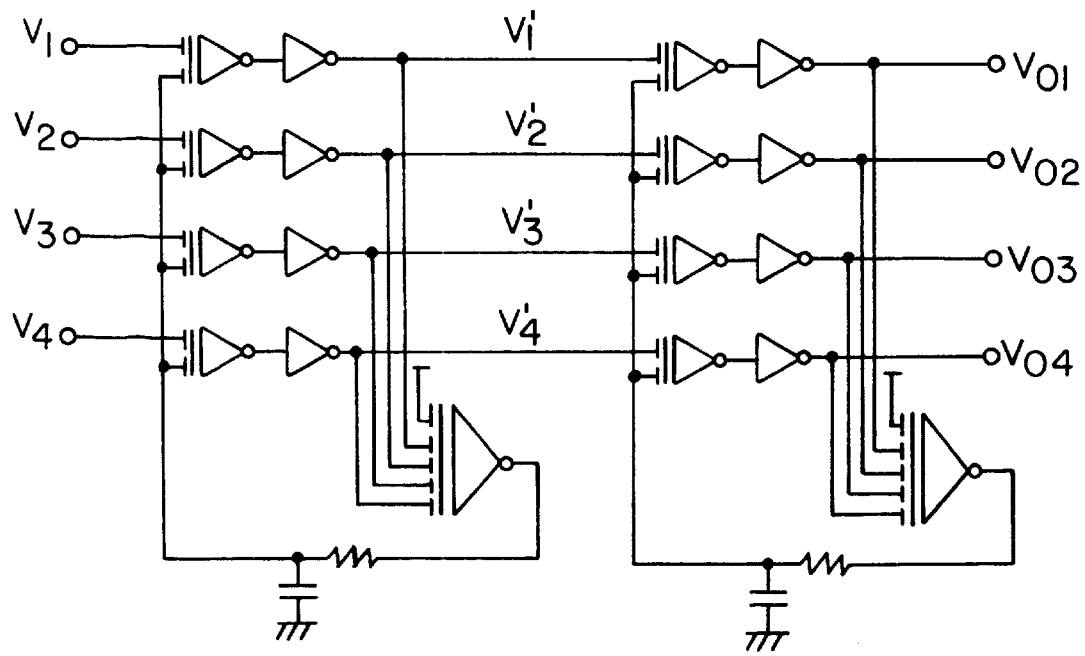
FIG. 43($a$) is an example in which the winner-take-all circuit of the fourteenth embodiment of the present invention has a multi-stage structure.
Figure 43B:
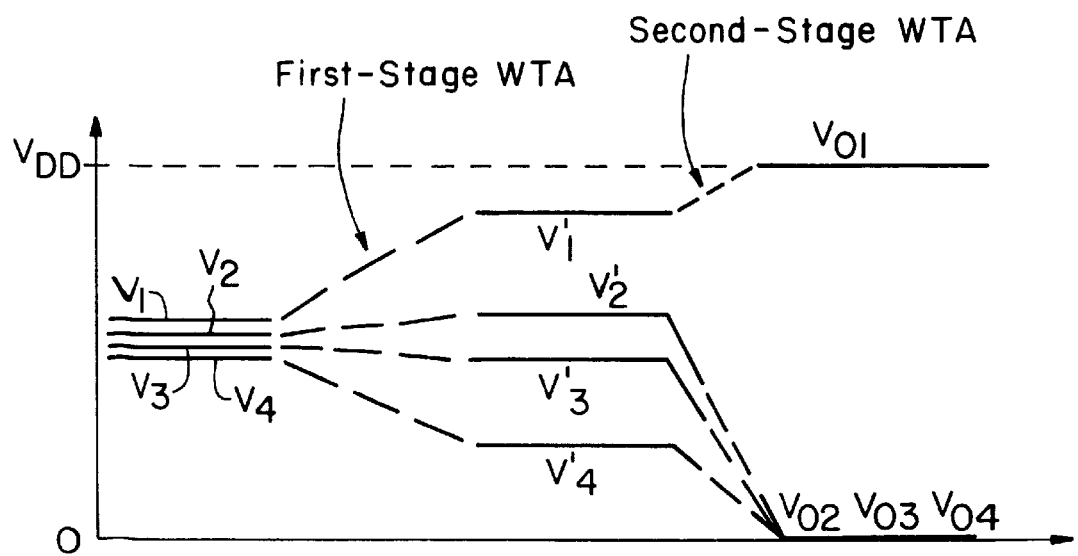
Figure 44:
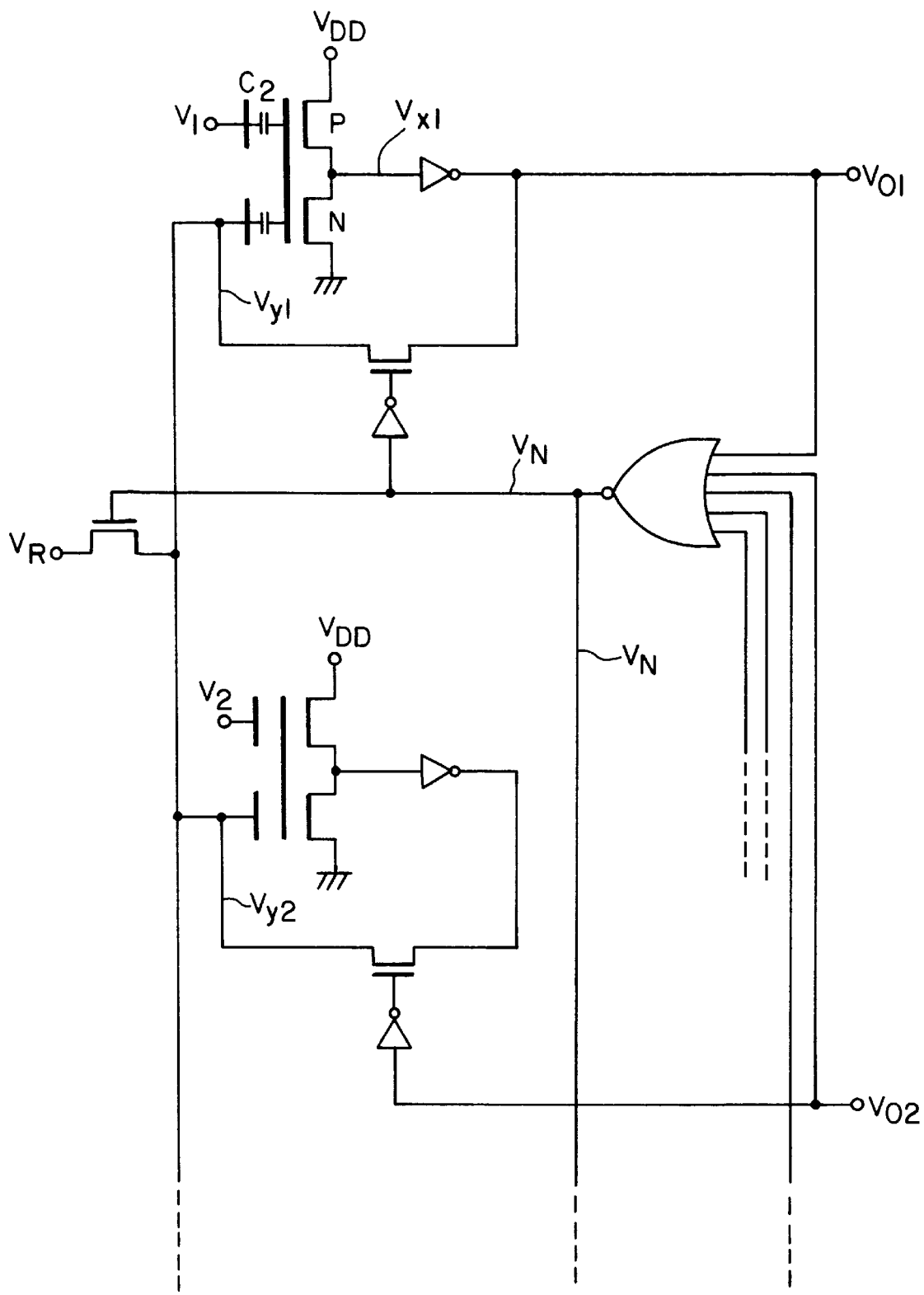
FIG. 44 is an example of a circuit used in the winner-take-all circuit of the fourteenth embodiment of the present invention.

FIG. 43 (*a*) is a circuit diagram showing 2 connected stages of time-continuous winner-take-all circuits, while FIG. 43 (*b*) is a graph showing the basic operating principle of the circuitry of FIG. 43(*a*) as a whole. When the difference in the input voltages was extremely small in the WTA circuits shown, it was not the case that after the output (the output of a cell A) corresponding to the largest input attained the value of 1, the other outputs reached a value of 0, but rather, the difference was simply amplified and increased. Accordingly, by connecting 2 such stages, it is possible to set the output of only that cell A having the input with the largest value to a value of 1, while the other outputs have a value of 0. The first stage is an example of a circuit in accordance with the present invention, for example, a circuit such as that in FIG. 1 or FIG. 29, but the second stage may be a different circuit. For example, it is possible to use the circuit shown in FIG. 44, which is disclosed in Japanese Patent Application, First Publication No. Hei 6–53431 (inventors: Tadashi Shibata, Tadahiro Ohmi).

Industrial Applicability

The semiconductor arithmetic circuit of the present invention makes possible highly functional operations with a simple structure; for example, it makes it possible to specify the input having the largest value from among a plurality of inputs at extremely high speed. In conventional methods employing software, it was necessary to conduct a comparison of all numbers, so as the number of data increased, the operation slowed down greatly; however, by means of the present invention, it has become possible for the first time to conduct a search for the largest value in real time.

What is claimed is:

1. A semiconductor arithmetic circuit, comprising:

an inverter circuit group comprising a plurality of inverter circuits each respectively having at least a first input gate and a second input gate;

said plurality of inverter circuits comprising at least one neuron MOS transistor each respectively having a semiconductor region of one conductivity type disposed on a substrate, a source region and a drain region each of an opposite conductivity type to said one conductivity type and being disposed on said semiconductor region, and a floating gate electrode in an electrically floating state;

means for applying a variably selective input signal to the first input gate of at least a respective one of said plurality of inverter circuits; and a logical operation circuit having at least one input and an output, said logical operation circuit being operative to receive output signals from said plurality of inverter circuits and to provide an output signal at the output thereof, the output signal from said logical operation circuit being operatively applied to the second input gate of each respective one of said plurality of inverter circuits;

wherein said semiconductor arithmetic circuit being selectively configurable to enable the identification of a particular one of said plurality of inverter circuits to which is being applied an input signal having a voltage value which satisfies a selected relative value ranking criteria involving a comparison with the voltage values respectively associated with each other input signal being applied to other ones of said plurality of inverter circuits and wherein the identification of said particular one inverter circuit occurring by the formation of a feedback oscillation loop includes said logical operation circuit and said particular one inverter circuit.

2. The semiconductor arithmetic circuit as recited in claim 1, further comprises:

a selectively variable voltage source for operatively applying a voltage to one input of said logical operation circuit;

wherein the voltage applied by said voltage source to said logical operation circuit being effective in defining the selected relative voltage value ranking criteria used in the identification of said particular one inverter circuit from among said plurality of inverter circuits.

3. The semiconductor arithmetic circuit as recited in claim 1, wherein said logical operation circuit further comprises:

an inverter circuit comprising at least one neuron MOS transistor and a floating gate electrode in an electrically floating state, the floating gate electrode providing a common gate terminal to each neuron MOS transistor and being capacitively coupled to each input of said logical operation circuit with a respective capacitive coupling coefficient associated therewith;

wherein the combination of capacitive coupling coefficients associated with the inputs of said logical operation circuit being effective in defining the selected relative voltage value ranking criteria used in the identification of said particular one inverter circuit from among said plurality of inverter circuits.

4. A semiconductor arithmetic circuit, comprising:

an inverter circuit group comprising a plurality of inverter circuits each respectively having at least a first input gate and a second input gate;

said plurality of inverter circuits comprising at least one neuron MOS transistor each respectively having a semiconductor region of one conductivity type disposed on a substrate, a source region and a drain region each of an opposite conductivity type to said one conductivity type and being disposed on said semiconductor region, and a floating gate electrode in an electrically floating state;

means for applying a variably selective input signal to the first input gate of at least a respective one of said plurality of inverter circuits; and a logical operation circuit having at least one input and an output, said logical operation circuit being operative to receive output signals from said plurality of inverter circuits and to provide an output signal at the output thereof, the output signal from said logical operation circuit being operatively applied to the second input gate of each respective one of said plurality of inverter circuits;

wherein said semiconductor arithmetic circuit being selectively configurable to enable the formation of a feedback oscillation loop including said logical operation circuit and a particular one of said plurality of inverter circuits, wherein the determination of said particular one inverter circuit being made in accordance with a comparison operation that involves determining which one of the input signals applied to the first input gates of said plurality of inverter circuits satisfies a selected relative value ranking criteria in relation to the voltage values respectively associated with each other input signal being applied to other ones of said plurality of inverter circuits.

5. A semiconductor arithmetic circuit, comprising:

a logical circuit group comprising a plurality of threshold logical circuits each respectively having at least a first input terminal and a second input terminal and being operative to undergo a change of state when the sum of or difference between signals operatively inputted into said at least two input terminals thereof exceeds a predetermined value;

means for applying a variably selective input signal to the first input terminal of at least a respective one of said plurality of threshold logical circuits; and a logical operation circuit having at least one input and an output, said logical operation circuit being operative to receive output signals from said plurality of threshold logical circuits and to provide an output signal at the output thereof, the output signal from said logical operation circuit being operatively applied to the second input terminal of each respective one of said plurality of threshold logical circuits;

wherein said semiconductor arithmetic circuit being selectively configurable to enable the identification of a particular one of said plurality of threshold logical circuits to which is being applied an input signal having a voltage value which satisfies a selected relative value ranking criteria involving a comparison with the voltage values respectively associated with each other input signal being applied to other ones of said plurality of threshold logical circuits and wherein the identification of said particular one threshold logical circuit occurring by the formation of a feedback oscillation loop includes said logical operation circuit and said particular one threshold logical circuit.

6. The semiconductor arithmetic circuit as recited in claim 5, further comprises:

a selectively variable voltage source for operatively applying a voltage to one input of said logical operation circuit;

wherein the voltage applied by said voltage source to said logical operation circuit being effective in defining the selected relative voltage value ranking criteria used in the identification of said particular one threshold logical circuit from among said plurality of threshold logical circuits.

7. The semiconductor arithmetic circuit as recited in claim 5, wherein said logical operation circuit further comprises:

an inverter circuit comprising at least one neuron MOS transistor and a floating gate electrode in an electrically floating state, the floating gate electrode providing a common gate terminal to each neuron MOS transistor and being capacitively coupled to each input of said logical operation circuit with a respective capacitive coupling coefficient associated therewith;

wherein the combination of capacitive coupling coefficients associated with the inputs of said logical operation circuit being effective in defining the selected relative voltage value ranking criteria used in the identification of said particular one threshold logical circuit from among said plurality of threshold logical circuits.

8. A semiconductor arithmetic circuit, comprising:

a logical circuit group comprising a plurality of threshold logical circuits each respectively having at least a first input terminal and a second input terminal and being operative to undergo a change of state when the sum of or difference between signals operatively inputted into said at least two input terminals thereof exceeds a predetermined value;

means for applying a variably selective input signal to the first input terminal of at least a respective one of said plurality of threshold logical circuits; and a logical operation circuit having at least one input and an output, said logical operation circuit being operative to receive output signals from said plurality of threshold logical circuits and to provide an output signal at the output thereof, the output signal from said logical operation circuit being operatively applied to the second input terminal of each respective one of said plurality of threshold logical circuits;

wherein said semiconductor arithmetic circuit being selectively configurable to enable the formation of a feedback oscillation loop including said logical operation circuit and a particular one of said plurality of threshold logical circuits, wherein the determination of said particular one threshold logical circuit being made in accordance with a comparison operation that involves determining which one of the input signals applied to the first input terminals of said plurality of threshold logical circuits satisfies a selected relative value ranking criteria in relation to the voltage values respectively associated with each other input signal being applied to other ones of said plurality of threshold logical circuits.

* * * * *